United States Patent
Wellington et al.

(10) Patent No.: US 9,779,330 B2
(45) Date of Patent: Oct. 3, 2017

(54) GRAIN QUALITY MONITORING

(71) Applicants: Deere and Company, Moline, IL (US); Carnegie Mellon University, Pittsburgh, PA (US)

(72) Inventors: Carl Knox Wellington, Pittsburgh, PA (US); Aaron J. Bruns, Bettendorf, IA (US); Victor S. Sierra, Waukee, IA (US); James J. Phelan, Bettendorf, IA (US); John M. Hageman, Silvis, IL (US); Cristian Dima, Sankt Ingbert (GE); Hanke Boesch, Tiefenthal (GE); Herman Herman, Gibsonia, PA (US); Zachary Abraham Pezzementi, Pittsburgh, PA (US); Cason Robert Male, Pittsburgh, PA (US); Joan Campoy, Pittsburgh, PA (US); Carlos Vallespi-gonzalez, Pittsburgh, PA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/583,473

(22) Filed: Dec. 26, 2014

(65) Prior Publication Data

US 2016/0189007 A1    Jun. 30, 2016

(51) Int. Cl.
| | |
|---|---|
| G06K 9/00 | (2006.01) |
| G06K 9/62 | (2006.01) |
| G06T 7/00 | (2017.01) |
| G06K 9/52 | (2006.01) |
| G06T 7/12 | (2017.01) |

(Continued)

(52) U.S. Cl.
CPC ....... *G06K 9/6267* (2013.01); *A01D 41/1277* (2013.01); *G06K 9/0014* (2013.01); *G06K 9/036* (2013.01); *G06K 9/52* (2013.01); *G06T 7/0004* (2013.01); *G06T 7/12* (2017.01); *G06K 9/342* (2013.01); *G06K 2209/17* (2013.01); *G06T 2207/20081* (2013.01); *G06T 2207/30108* (2013.01)

(58) Field of Classification Search
None
See application file for complete search history.

(56) References Cited

U.S. PATENT DOCUMENTS

| | | |
|---|---|---|
| 6,119,442 A | 9/2000 | Hale |
| 7,771,262 B2 | 8/2010 | Missotten |

(Continued)

OTHER PUBLICATIONS

Majumbar et al (CLassification of cereal grains using machine vision); Dept of Biosystem engineering , Jan. 2000.*

(Continued)

*Primary Examiner* — Nancy Bitar
(74) *Attorney, Agent, or Firm* — Rathe Lindenbaum LLP

(57) ABSTRACT

A method and non-transitory computer-readable medium capture an image of bulk grain and apply a feature extractor to the image to determine a feature of the bulk grain in the image. For each of a plurality of different sampling locations in the image, based upon the feature of the bulk grain at the sampling location, a determination is made regarding a classification score for the presence of a classification of material at the sampling location. A quality of the bulk grain of the image is determined based upon an aggregation of the classification scores for the presence of the classification of material at the sampling locations.

20 Claims, 16 Drawing Sheets

(51) Int. Cl.
*G06K 9/03* (2006.01)
*A01D 41/127* (2006.01)
*G06K 9/34* (2006.01)

(56) References Cited

U.S. PATENT DOCUMENTS

| | | | |
|---|---|---|---|
| 7,953,264 B2* | 5/2011 | Levenson | G06K 9/6247 356/36 |
| 8,045,168 B2 | 10/2011 | Missotten et al. | |
| 8,218,912 B2 | 7/2012 | Missotten et al. | |
| 8,337,283 B2 | 12/2012 | Kormann et al. | |
| 2003/0216158 A1 | 11/2003 | Bischoff | |
| 2004/0141641 A1* | 7/2004 | McDonald, Jr. | G06K 9/00127 382/159 |
| 2005/0074146 A1* | 4/2005 | Jones | G01N 15/1475 382/110 |
| 2007/0056258 A1 | 3/2007 | Behnke | |
| 2007/0149265 A1 | 6/2007 | Behnke et al. | |
| 2009/0021751 A1* | 1/2009 | Jonasson Bjarang | B07C 5/3425 356/601 |
| 2009/0074243 A1 | 3/2009 | Missotten et al. | |
| 2009/0125197 A1 | 5/2009 | Behnke | |
| 2009/0233661 A9 | 9/2009 | Gehnke et al. | |
| 2009/0291723 A1 | 11/2009 | Missotten | |
| 2009/0297040 A1 | 12/2009 | Mossotten et al. | |
| 2010/0121541 A1 | 5/2010 | Behnke et al. | |
| 2012/0004815 A1 | 1/2012 | Behnke | |
| 2012/0262568 A1 | 10/2012 | Ruthenberg | |
| 2014/0260623 A1* | 9/2014 | Salem | G01N 23/20 73/584 |

OTHER PUBLICATIONS

L. Thylén, and M. Gilbertsson, "An On-Line Protein Sensor—From Research to Product", fifth international conference on precision agriculture—Zeltex.

Majumdar S et al: "Classification of Cereal Grains Using Machine Vision: IV. Combined Morphology, Color, and Texture Models",Transactions of the American Society of Agricultural Engineers, American Society of Agricultural Engineers. St.Joseph, MI, US, vol. 43, No. 6, Jan. 1, 2000, pp. 1689-1694.

Megha R Siddagangappa et al: "Classification and Quality Analysis of Food Grains", IOSR Journal of Computer Engineering Ver. 111, Jan. 1, 2014 (Jan. 1, 2014), pp. 2278-8727, XP055277688, Retrieved from the Internet: URL:http://www. iosrjournals.org/iosr-jce/papers/Vol16-issue4/Version-3/A01643011 O.pdf.

Majumdar S et al: "Classification of Cereal Grains Usingmachine Vision: I. Morphology Models",Transactions of the American Society of Agricultural Engineers, American Society of Agricultural Engineers. St.Joseph, MI, US, vol. 43, No. 6, Jan. 1, 2000 (Jan. 1, 2000), pp. 1669-1675.

Wan Y N et al: "Adaptive classification method for an automatic grain quality inspection system using machine vision and neural network", 2000 ASAE Annual International Meeting, Milwaukee, Wisconsin, USA, Jul. 9, 2000 (Jul. 9, 2000), pp. 1-18.

Du, C-J and Sun D-W: "Recent developments in the applications of image processing techniques for food quality evaluation", Trends in Food Science and Technology, Elsevier Science Publishers, GB, vol. 15, No. 5, May 1, 2004 (May 1, 2004), pp. 230-249.

EP Search Report dated Jun. 21, 2016 for 15196200.8-1906/ 30389054.

* cited by examiner

GRAIN QUALITY MONITORING

BACKGROUND

The value of bulk grain may depend upon the quality of the bulk grain. High quality grain is reflected by high percentages of clean unbroken grain and low percentages of broken grain and material other than grain (MOG). Monitoring the quality of bulk grain is often difficult and subject to error.

DETAILED DESCRIPTION OF EXAMPLES

Figure 1:
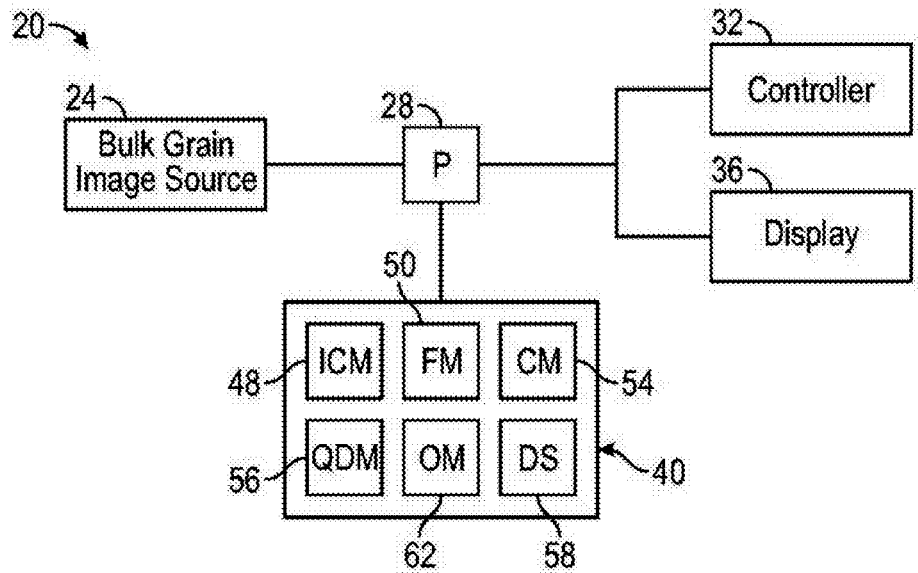
FIG. 1 is a schematic diagram of an example grain quality monitoring system.

FIG. 1 schematically illustrates an example grain quality monitoring system 20. As will be described hereafter, system 20 accurately estimates or determines the quality of bulk grain. System 20 comprises bulk grain image source 24, processor 28, controller 32, display 36 and memory 40. Bulk grain image source comprises one or more devices configured to capture at least one image of bulk grain for analysis by system 20 in determining quality of the grain. In one implementation, "bulk grain" refers to a mass of harvested product which when clean includes only grain of the particular intended crop being harvested, but which, when not clean, additionally includes some of broken grain, skinned grain, unthreshed grain of the intended crop, grain of unintended plants such as weeds or volunteer plants, and/or other non-grain elements such as chaff, hulls, sticks, stock, cobs, stems, pods, dirt or other foreign contaminants. In one implementation, a camera, such as an optical camera or an infrared camera, captures at least one image of bulk grain.

In one implementation, bulk grain image source 24 comprises a camera mounted or supported by a piece of grain harvesting equipment, such as a harvester. For example, in one implementation, bulk grain image source 24 comprises a camera mounted along a grain elevator of a harvester and/or a camera mounted along the tailings elevator of a harvester. In another implementation, bulk grain image source 24 comprises a camera mounted along a grain tank of a harvester. In yet another implementation, bulk grain image source 24 is mounted at other locations of a harvester along which harvested grain is conveyed or gathers.

In yet other implementations, bulk grain image source 24 comprises a camera mounted or supported to capture images of bulk grain at other locations where bulk grain is conveyed or collected. For example, in one implementation, bulk grain image source 24 comprises a camera mounted along an elevator or conveyor, or along an internal grain collecting volume or tank, of a grain transport vehicle, a grain bin or other grain aggregation location. Bulk grain image source 24 outputs signals representing the image which are received by processor 28.

Processor 28 comprises at least one processing unit configured to analyze the bulk grain images received from source 24 and to provide output based upon such analysis. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, in other implementations, processor 28 is embodied as part of one or more application-specific integrated circuits (ASICs). Unless otherwise specifically noted, the controller is not limited to any specific combination of hardware circuitry and software, nor to any particular source for the instructions executed by the processing unit.

Controller 32 comprises one or more processing units configured to output control signals directing the operation of a piece of grain handling equipment. For example, in one implementation, controller 32 outputs control signals that control and adjust operational parameters of a piece of harvesting equipment. In one implementation, controller 32 controls one or more operational parameters of a combine harvester. For example, controller 32 outputs control signals adjusting concave spacing, conveyor speed and/or fan speed of a combine harvester. In another implementation, controller 32 controls one or more operational parameters of a grain conveying system, wherein grain selectively conveyed to one of a plurality of different available locations or operations in response to signals from controller 32. For example, depending upon the quality level of grain as indicated by system 20, controller 32 selectively turns on and off different conveyors to convey grain to different locations such as to different grain screening or filtering operations or different grain use destinations.

Display 36 comprises one or more devices by which information regarding the quality of grain is visibly displayed. For example, in one implementation, display 36 comprises a series of light emitting diodes that provide alerts or notifications regarding grain quality. In another implementation, display 36 comprises a display screen, such as a touch screen. In one implementation, display 36 additionally comprises speakers or other auditory devices by which information is communicated. In one implementation, display 36 is provided in the cab of a piece of harvesting equipment to indicate grain quality to an operator during the harvest of grain. In another implementation, display 36 is provided remote from the harvester, such as when the harvest is remotely controlled or such as when grain quality is being reviewed by a remote manager.

Memory 40 comprises a non-transitory computer-readable medium containing program logic, in the form of code, software, circuitry or instructions, which direct the operation of processor 28. Memory 40 additionally serves as a persistent storage device by which data is stored. Although memory 40 is illustrated as a single memory, in other implementations, memory 40 is distributed amongst multiple memory devices or memory locations, such as across a local area network or a wide area network. In the example illustrated, memory 40 comprises software modules which carry out analysis of grain quality and which provide for direct output based upon the results of such analysis. In the example illustrated, memory 40 comprises image capture module 48 feature module 50, classification module 54, quality determination module 56, data storage portion 58 and output module 62.

Figure 2:
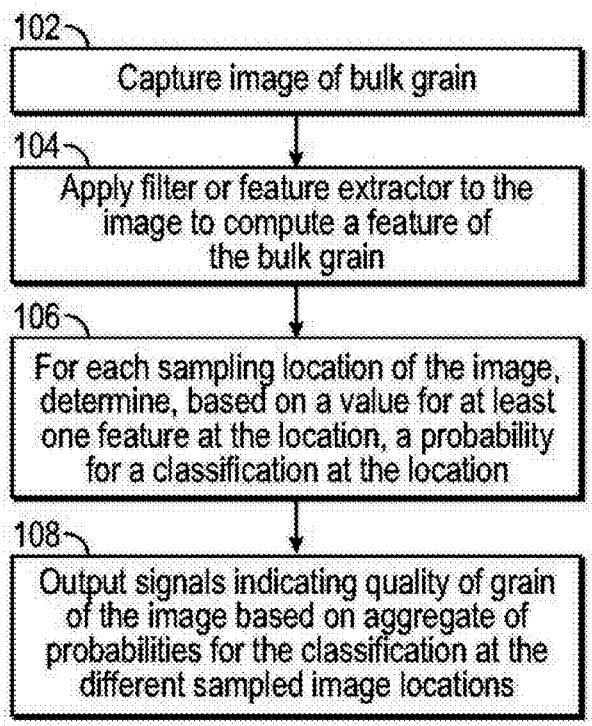
FIG. 2 is a flow diagram of an example method for monitoring grain quality.

Image capture module 48, feature module 50, classification module 54, quality determination module 56, data storage portion 58 and output module 62 each comprises program logic to direct processor 28 in the implementation of method 100 outlined in FIG. 2. As indicated by block 102 of FIG. 2, image capture module 48 directs processor 28 to receive or otherwise acquire an image of bulk grain from bulk grain image source 24. In one implementation, image capture module 48 directs processor 28 to carry out one or more processes upon the image of bulk grain received from source 24 to enhance image quality. In one implementation, image capture module 48 further directs processor 28 to output control signals controlling bulk grain image source 24 in the capture of an image of bulk grain.

As indicated by block 104 in FIG. 2, feature module 50 directs processor 28 to apply a feature extractor to and across the bulk grain image to extract or compute a feature of the bulk grain generally across the image, irrespective of any particulate boundaries or grain boundaries in the image, so as to identify variations in the feature across the area of the bulk grain image. A feature of the bulk grain image is a characteristic or aspect of the bulk grain image. As will be described hereafter, in some implementations, one or more feature extractors may be additionally applied to segments, based upon particular identified boundaries or grain boundaries, of the bulk grain image.

Figure 3A:
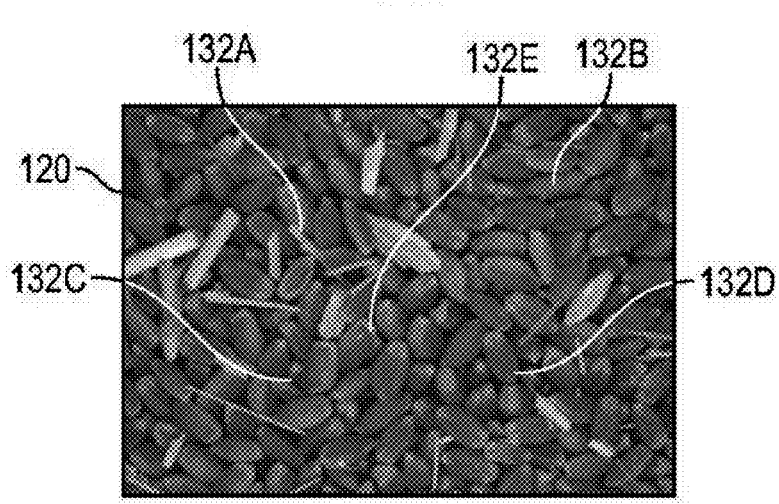
FIG. 3A illustrates an example bulk grain image.

FIG. 3A illustrates an example bulk grain image 120. As shown by FIG. 3A, the bulk grain image 120 comprises a two dimensional image made up of a two-dimensional array of image pixels. In the example illustrated, a pixel is a smallest addressable element. Each bulk grain image pixel has an associated set of characteristics or features based upon the original bulk grain from which the image was captured.

As shown by FIGS. 3B-3E, the application of various example feature extractors to bulk grain image 120 produces feature images 122, 124, 126 and 130. Each feature image 122, 124, 126 and 130 is based upon the original bulk grain image 120 except that a selected image feature associated with each pixel is separated or filtered out from remaining features associated with each pixel. The feature that is filtered out by the filter or feature extractor will have different values at different locations or pixels across the feature image 122, 124, 126 and 130. Such values may vary on a pixel by pixel basis or groups of adjacent pixels may have the same value for the particular feature.

Figure 3B:
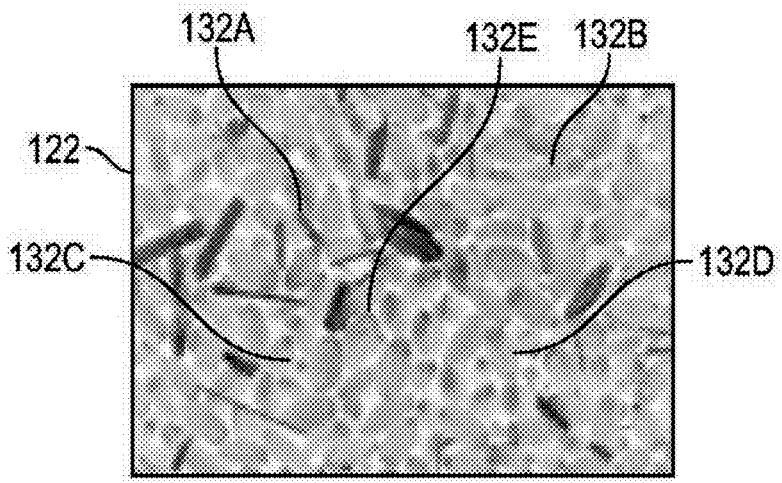
FIGS. 3B-3E illustrate the application of different feature extractors to the bulk grain image of FIG. 3A.
Figure 3C:
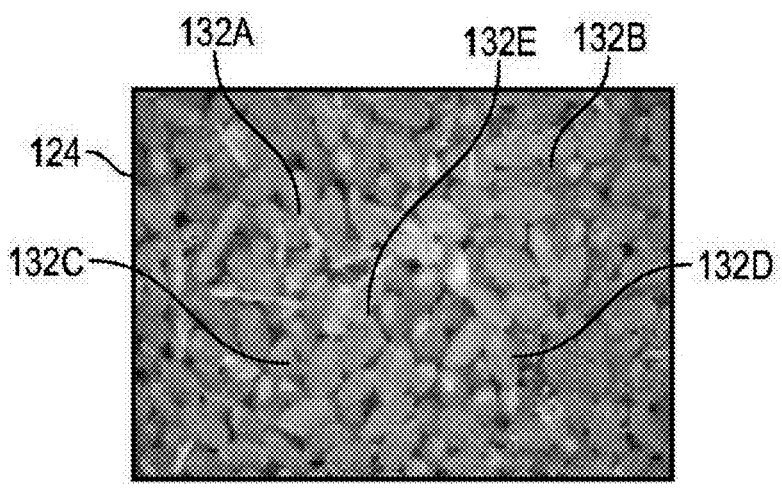
Figure 3D:
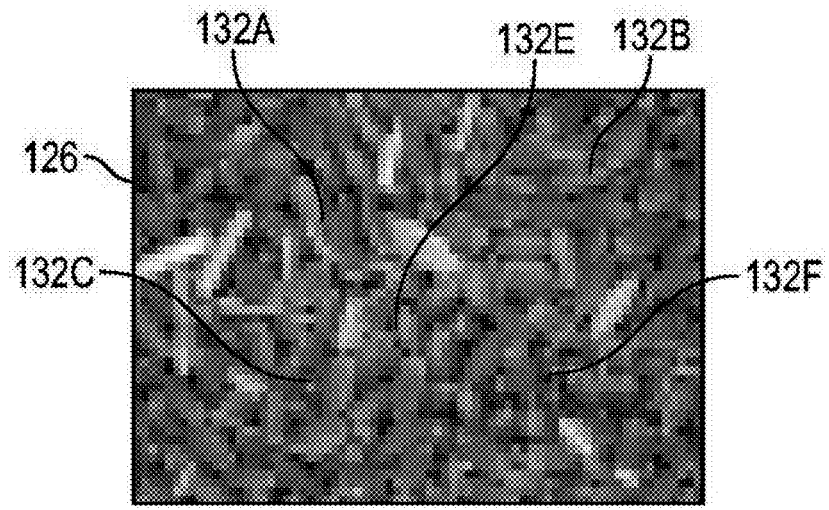
Figure 3E:
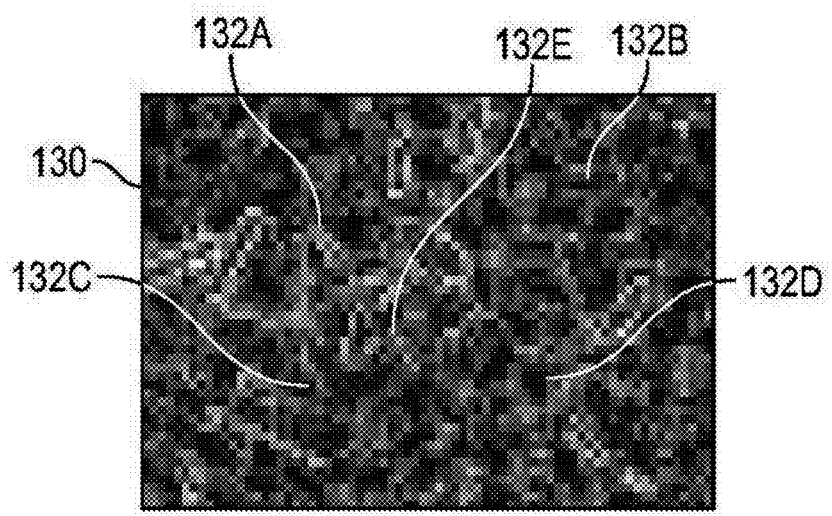

In the example illustrated, FIG. 3B illustrates application of a color filter to the image of FIG. 3A to form feature image 122. FIG. 3C illustrates application of a different color filter to the image of FIG. 3A to form feature image 124. FIG. 3D illustrates application of an intensity filter at a larger scale to the image of FIG. 3A to form feature image 126. FIG. 3E illustrates application of a discrete cosine transform filter, to the image of FIG. 3A to form feature image 130. Examples of feature extractors include, but are not limited to, intensity/color filters at various scales, intensity/color variation at various scales, edge detectors, corner detectors, Haar filters, Gabor filters, wavelet filters, discrete cosine transform, fast Fourier transform, texture filters, histogram of oriented gradients (HOG), keypoint descriptors, and convolutions with sets of filter banks. In one implementation, feature module 50 directs processor 28 to apply multiple feature extractors to extract multiple features or stacks of features of the bulk grain in the bulk grain image.

As indicated by block 106 of FIG. 2, classification module 54 directs processor 28 to sample values for at least one feature at different selected or sampled locations of the bulk grain image. In the example illustrated, FIG. 3A illustrates five example sampling locations 132A, 132B, 132C, 132D and 132E. In one implementation, the sampling locations, for which the values for at least one feature are sampled, are randomly chosen by classification module 54. In one implementation, the random selection of sampling locations by classification module 54 is unconstrained. In another implementation, the selection of sampling locations by classification module 54 is in accordance with one or more predefined constraints or restrictions. For example, in one implementation, the sampling locations are randomly chosen so long as the chosen sampling locations satisfy predefined distribution across the bulk grain image sample. In one implementation, the sampling locations are randomly chosen so long as the chosen sampling locations have a minimum spacing from one another, have a maximum spacing from one another or are within a predefined range of spacings from one another. In another implementation, the sampling locations are randomly chosen, but wherein each zone or portion of the bulk grain image, such as each quadrant, contain a predefined minimum number of sampling locations or contain no greater than a predefined maximum number of sampling locations.

In another implementation, the sampling locations are predefined or preselected by classification module 54. For example, in one implementation, classification module 54 directs processor 28 to analyze values for at least one feature at predefined sampling locations according to a predefined pattern of locations. For example, in one implementation, classification module 54 extracts and analyzes values for at least one feature from every other pixel of bulk grain image 120, from every fourth pixel of bulk grain image 120 or the like. Given sufficient computing capability, such as speed, in one implementation, classification module 54 directs processor 28 to analyze values for at least one feature from each and every pixel of bulk grain image 120. However, to reduce processing load and processing time for analyzing grain quality, classification module 54 directs processor 28 to extract and utilize values for at least one feature from only selected sampling locations or pixels, or a portion of the total number of pixels, of bulk grain image 120.

At each of sampling locations 132, classification module 54 directs processor 28 to determine, based upon the value for the feature at the sampling location or based upon the value for each of the features at the sampling location, a classification score. Classification module 54 takes a feature or set of features as an input and produces a classification score as an output that represents how likely those input features are to belong to a class of interest. For example, in one implementation, classification module 54 directs processor 28 to determine a classification score for the presence of a particular classification, such as mass other than grain (MOG), at the particular sampling location 132A. In one implementation, the determination of the probability for the presence of a particular classification, such as MOG, at the particular sampling location 132A is determined based upon the value for a single feature at sampling location 132A. For example, in one implementation, classification module 54 determines the classification score for the presence of MOG sampling location 132A is based upon the value for the feature at the corresponding sampling location 132A in one of feature image 122, feature image 124, feature image 126, feature image 130, or a different feature image of extracted feature values for a different particular feature. In another implementation, classification module 54 determines a classification score for the presence of MOG at the particular sampling location 132A based upon the value of each of multiple features at sampling location 132A. For example, in one implementation, classification module 54 determines a classification score for the presence of MOG at the particular sampling location 132 based upon the value for a first feature at the corresponding sampling location 132A in feature image 122 and additionally based upon the value for a second feature at the corresponding sampling location 132A in feature image 124. In yet other implementations, the classification score for the presence of a particular classification at a particular sampling location is based upon the value for more than two features at the particular sampling location.

As further shown by FIG. 3A, classification module 54 directs processor 28 to determine a classification score, as described above, for a particular classification at each of a multitude of different sampling locations. For example, classification module 54 (1) determines a first classification score for the presence of a particular material classification, such as MOG, at sampling location 132A, (2) determines a second classification score for the presence of the same particular material classification, such as MOG at sampling location 132B, (3) determines a third classification score for the presence of the same particular classification, such as MOG at sampling location 132C, and so on for each sampling location. Although FIG. 3A illustrates five sampling locations 132, in other implementations, classification module 54 may determine a classification score at a greater or lesser number of such sampling locations.

In one implementation, classification module 54 directs processor 28 to determine a classification score for each of multiple different material classifications at each sampling location 132. For example, in one implementation, classification module 54 assigns each sampling location a classification score for each of a plurality of different classifications. In the example illustrated, the classification score comprises a probability value. For example, classification module 54 may assign the sampling location a probability of x % that the image sample is depicting a first classification of material and a probability of z % that the sampling location is depicting a second classification of material and so on, wherein the sum of the probabilities does not exceed 100%. For example, in one implementation, classification model 54 directs processor 28 to determine a probability for the presence of a first material classification, such as broken grain, at a sampling location as well as a probability for the presence of a second different material classification, such as MOG, MOG heavy or MOG light, at the same sampling location. In other implementations, the classification score determined by classification module 54 comprises a likelihood, a percentage, a distance from a decision surface, a binary output, an output from an artificial neural network, an output from a deep convolutional neural network, or any of many other classifier output values.

In one implementation, each sampling location comprises an individual pixel, the smallest addressable unit, of the bulk grain image 120, wherein the value for a feature of the individual pixel of the bulk grain image or wherein the value of each feature of a set of features of the individual pixel of the bulk grain image is used to determine a probability for the presence of a particular material classification at the individual pixel serving as the sampling location.

In other implementations, the sampling location alternatively comprises a predefined set of pixels, wherein the value for a feature of each of the individual pixels of the set or wherein value of each feature of a set of features of each of the individual pixels of the set are collectively used to determine a probability for the presence of a particular material classification at the sampling location. For example, in one implementation, a sampling location is defined as a set of four adjacent pixels, wherein each of the four values for one feature from the four adjacent pixels is used to define a probability for the presence of a particular grain or harvested product classification at the sampling location. For example, in one implementation, a median, average, largest observation, smallest observation or other statistical value derived from the four values for the one feature from the four adjacent pixels is used to determine the probability for the presence of a particular material classification at the sampling location. In another implementation, a median, average, largest observation, smallest observation or other statistical value derived from the four values from the four adjacent pixels for each of a plurality of features is used to determine the probability for the presence of a particular material classification at the sampling location.

In one implementation, classification module 54 determines a probability for the presence of a particular classification at a sampling location by consulting a predetermined lookup table containing different values for different features and different probabilities for different classifications of materials corresponding to the different values for the different features. In one implementation, probability entries in the lookup table are generated by taking multiple grain samples, capturing an image of each of the multiple grain samples, applying a feature extractor to each of the images to extract a feature in each of the images, measuring the feature in each of the images to determine a value for the feature, and determining the actual composition or classification of the material in the grain sample by labeling the image of the grain sample or by sifting or filtering through each of the actual grain samples. Based upon data acquired from such a process carried out on multiple grain samples, probabilities that particular feature values correspond to a particular classification of material are identified to populate the lookup table.

In another implementation, classification module 54 applies one or more algorithms to the value for the extracted feature, or to values for multiple extracted features, to determine a probability that the image sample corresponds to a classification of material. In such an implementation, the one or more algorithms are created in a fashion similar to the above process used to populate the above-described lookup table. In particular, a mathematical relationship between different values for an extracted feature, or for multiple extracted features of an image sample and a probability that the image sample is depicting a particular classification of material is determined by taking multiple grain samples, capturing an image of each of the multiple grain samples, applying a filter to each of the images to extract a feature in each of the images, measuring the feature in each of the images to determine a value for the feature, and determining the actual composition or classification of the material in the grain sample by labeling the image of the grain sample or by sifting or filtering through each of the actual grain samples.

In the example illustrated, classification module 54 is operable in one of various modes selectable by a user of system 20, wherein system 20 analyzes bulk grain for different classifications of material. For example, in one mode of operation, classification system 20 analyzes bulk grain for a single classification of material. In another mode of operation, system 20 analyzes bulk grain for each of multiple different classifications of material selected by the user of system 20. Examples of different classifications of material for which classification module 54 makes a prediction with regard to each individual image sample include, but are not limited to, one or more of: one or more ranges regarding material other than grain (MOG), such as MOG light, MOG heavy or other more specific classifications of material such as hull, broken, sticks, stock, cobs, stems, pods, unthreshed grain, skinned grain, and clean grain. In other implementations, classification module 54 may predict other classifications of material depending upon a particular grain type and the particular plant from which the grain is harvested.

As indicated by block 108 in FIG. 2, quality determination module 56 directs processor 28 in the determination of grain quality of grain represented by the bulk grain image received from the bulk grain image source 24. Quality determination module 56 converts sampling location probabilities into an overall estimate of the grain quality, including estimates of the amount of each material classification of interest. Quality determination module 56 determines and outputs a signal or signals indicating quality of grain for the bulk grain image based upon an aggregate of the probabilities of the different sampling locations, for the particular material classification. In one implementation, quality determination module 56 performs a statistical operation on the probabilities, wherein the resulting value from the statistical operation is used to output a value indicating what percentage of the material depicted in the bulk grain image 120 is a particular material classification or values indicating what percent of the material depicted in the bulk grain image is a first material classification, what percent of the material depicted in the bulk grain image is a second material classification and so on. For example, in one scenario, quality determination module 56 may output a value indicating that 70% of the material depicted in the bulk grain image 120 constitutes clean grain, 20% of the material depicted in the bulk grain image constitutes broken grain and 10% of the material depicted in the bulk grain image constitutes MOG. In one implementation, quality determination module 56 sums and averages the probabilities for each class or classification of material over all of the sampling locations in the image to determine what percentage of the material depicted in the bulk grain image constitutes a particular classification of material In one implementation, quality determination module further applies a calibration function to the results to produce an estimate of percent mass for the particular classification of material and/or a percent mass for clean grain. In one implementation, quality determination model 56 further applies time filters to the results over multiple bulk grain images 120, such as applying a simple weighted moving window filter. In one implementation, quality module 56 further accounts for image overlap in the time filter. In another implementation, the quality determination module 56 applies a weighted filter based on amount of material presented to the bulk grain image source 24, as opposed to being based on time.

Referring once again to FIG. 1, data storage 58 comprises one portion of memory 40 that stores the results of the grain quality diagnosis/analysis performed by system 20. In one implementation, data storage 58 additionally stores any databases or data tables used by feature module 50, classification module 54 and quality determination module 56. As noted above, in some implementations, data storage 58 is carried by a piece of harvesting equipment, such as the combine harvester. In other implementations, data storage 58 comprises a database remote from processor 28 and/or bulk grain image source 24, wherein results are transmitted to data storage 58 across a wired or wireless local area network or wide area network.

Output module 62 comprises program logic contained in memory 40 for directing processor 28 to utilize the results of the grain quality diagnosis/analysis. In one implementation, output module 62 displays the grain quality diagnosis results in one or more preset or predefined formats on display 36. As a result, an operator of the piece of harvesting equipment or the operator/manager of the grain handling device or facility is notified of changes in grain quality, allowing the operator or manager to make manual adjustments to the piece of harvesting equipment or the grain handling facility.

In one implementation, output module 62 further directs processor 28 to store the results of the grain quality analysis in data storage 58. For example in one implementation in which such grain quality analysis is carried out during the harvest of the grain by harvesting machine, output module 62 may additionally acquire geo-referenced signals indicating the location in a field from which grain having particular grain quality is harvested. In one implementation, output module 62 generates field maps which indicate the quality of grain harvested from different geo-referenced portions of the mapped field. In one implementation, such stored information or stored grain quality field maps is subsequently used to adjust future field operations. For example, using such stored information or stored grain quality field maps, operations such as future planting, future herbicide, insecticide or fertilizer application, future cultivation and/or future harvesting parameters may be adjusted.

In one implementation, output module 62 additionally or alternatively utilizes the results of the grain quality analysis/diagnosis to output adjustment signals, which are transmitted to machine controller 32. In response to receiving such signals, machine controller 32 outputs adjusted control signals that adjust one or more operational parameters of the harvesting equipment, such as the combine harvester, while it is harvesting the grain. For example, in one implementation, in response to a diagnosis that there is currently a high level of material other than grain (MOG), a level above a predefined threshold of MOG, output module 62 directs processor 28 to output adjustment signals to controller 32 to output control signals such as to increase the speed of the cleaning fan which blows chaff and other foreign matter from the grain. In one implementation, in response to a diagnosis that the bulk grain contains a high level of broken, a quantity greater than a predefined threshold, output module 62 directs processor 28 to output adjustment signals to controller 32 that causes machine controller 32 to output signals to adjust a setting of the threshing component that separates grain from the rest of the plant, such as the concave spacing in a combine harvester.

In one implementation, such adjustment is done in real time and is performed automatically in response to the grain quality results. In yet another implementation, the adjustment is recommended to an operator, or the adjustment is automatically carried out in response to receiving authorization or confirmation from the operator. In one implementation, such adjustments are automatically done only upon such grain quality values satisfying a predefined threshold for a minimum period of time.

Figure 4:
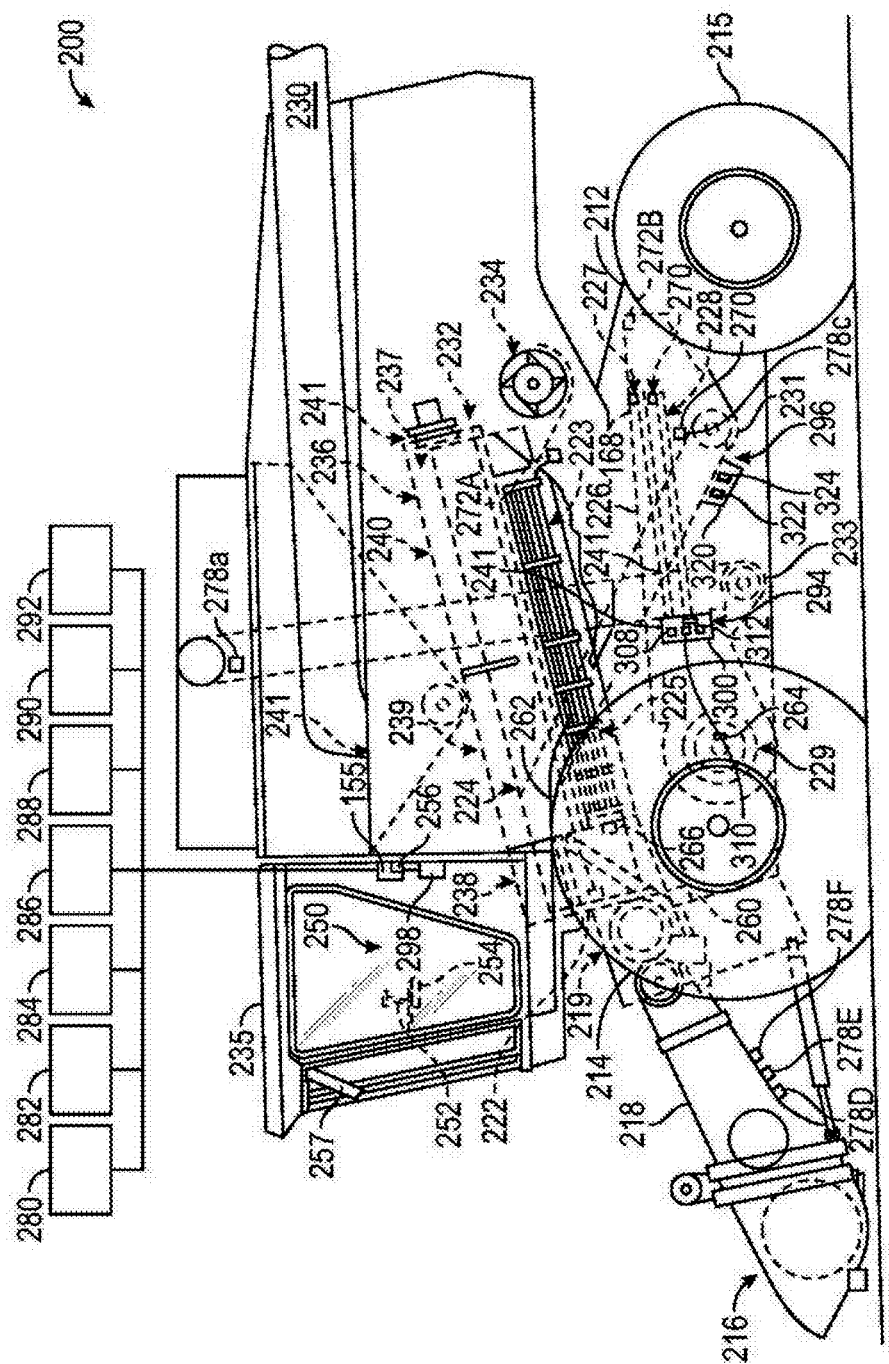
FIG. 4 is a side view of an example combine harvester including an example grain quality monitoring system.
Figure 5:
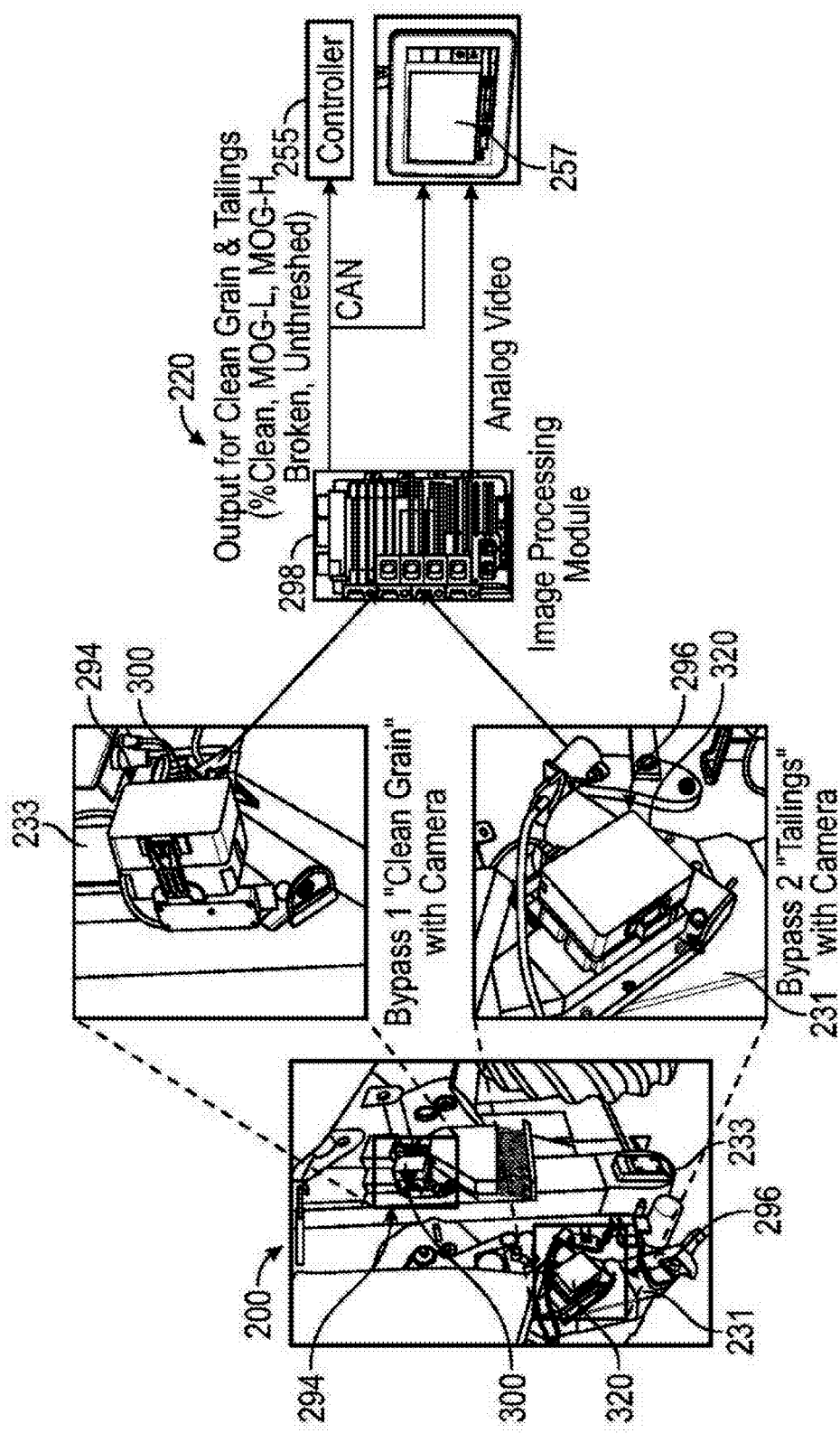
FIG. 5 is a diagram illustrating example hardware of the grain quality monitoring system of the combine harvester of FIG. 4.
Figure 6:
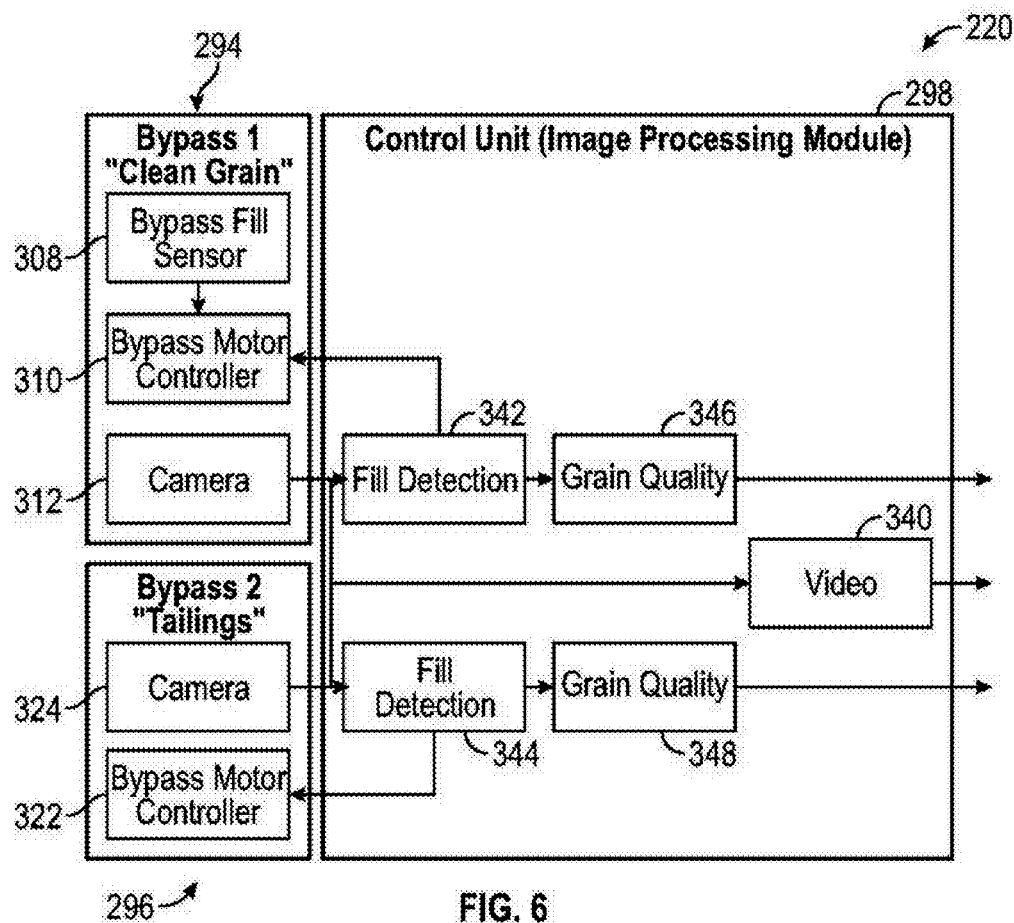
FIG. 6 is a block diagram of the grain quality monitoring system of FIG. 5.

FIGS. 4-6 illustrate an example agricultural harvester in the form of a combine 200 that incorporates grain quality monitoring system 220, an example implementation of grain quality monitoring system 20. As shown by FIG. 4, combine 200 comprises a main frame 212 having wheel structure including front and rear ground engaging wheels 214 and 215 supporting the main frame for forward movement over a field of crop to be harvested. The front wheels 214 are driven by an electronically controlled hydrostatic transmission.

A vertically adjustable header or harvesting platform 216 is used for harvesting a crop and directing it to a feeder house 218. The feeder house 218 is pivotally connected to the frame 212 and includes a conveyor for conveying the harvested crop to a beater 219. The beater 219 directs the crop upwardly through an inlet transition section 222 to a rotary threshing and separating assembly 224. In other implementations, other orientations and types of threshing structures and other types of headers 216, such as transverse frame supporting individual row units, are utilized.

The rotary threshing and separating assembly 224 threshes and separates the harvested crop material. Grain and chaff fall through a concave 225 and separation grates 223 on the bottom of the assembly 224 to a cleaning system 226, and are cleaned by a chaffer 227 and a sieve 228 and air fan 229. The cleaning system 226 removes the chaff and directs the clean grain to a clean grain tank by a grain elevator 233. The clean grain in the tank can be unloaded into a grain cart or truck by unloading auger 230. Tailings fall into the return elevator or auger 231 and are conveyed to the rotor 237 where they are threshed a second time.

Threshed and separated straw is discharged from the rotary threshing and separating assembly 224 through an outlet 232 to a discharge beater 234. The discharge beater 234 in turn propels the straw out the rear of the combine. It should be noted that the discharge beater 234 could also discharge crop material other than grain directly to a straw chopper. The operation of the combine is controlled from an operator's cab 235.

In the example illustrated, the rotary threshing and separating assembly 224 comprises a cylindrical rotor housing 236 and a rotor 237 located inside the housing 236. The front part of the rotor and the rotor housing define the infeed section 238. Downstream from the infeed section 238 are the threshing section 239, the separating section 240 and the discharge section 241. The rotor 237 in the infeed section 238 is provided with a conical rotor drum having helical infeed elements for engaging harvested crop material received from the beater 219 and inlet transition section 222. Immediately downstream from the infeed section 238 is the threshing section 239.

In the threshing section 239, the rotor 237 comprises a cylindrical rotor drum having a number of threshing elements for threshing the harvested crop material received from the infeed section 238. Downstream from the threshing section 239 is the separating section 240 wherein the grain trapped in the threshed crop material is released and falls to the cleaning system 228. The separating section 240 merges into a discharge section 241 where crop material other than grain is expelled from the rotary threshing and separating assembly 224.

An operator's console 250 located in the cab 235 includes conventional operator controls including a hydro shift lever 252 for manually controlling the speed range and output speed of the hydrostatic transmission. An operator interface device 254 in the cab 235 allows entry of information into a controller 255 comprising an on-board processor system, which provides automatic speed control and numerous other control functions described below for the harvester 200. The operator can enter various types of information into the operator interface device 254, including crop type, location, yield and the like. In the example illustrated, combine harvester 200 additionally comprises display 257 for presenting information to the operator. In some implementations, display 257 may additionally serve as an input device, such as when display 257 comprises a touch screen. In other implementations, display 257 may be combined with interface device 254, such as part of counsel 250.

Signals from the sensors include information on environmental variables such as relative humidity, and information on variables controlled by the on-board control system. Signals include vehicle speed signals from a radar sensor or other conventional ground speed transducer 260, rotor and fan speed signals from transducers 262 and 264, and concave clearance and chaffer and sieve opening signals from transducers 266, 268 and 270, respectively. Additional signals originate from a grain loss sensor 272a at the exit of the rotary threshing and separating assembly 224 and left- and right-hand grain loss sensors 272b at the exit of the cleaning system 226, and various other sensor devices on the harvester. Signals from a mass flow sensor 278a, a grain moisture sensor 278b, a tailings volume sensor 278c, and relative humidity, temperature and material moisture sensors 278d, 278e and 278f are also provided.

A bus directs signals from the mentioned sensors and an engine speed monitor, a grain mass flow monitor, and other microcontrollers on the harvester to the controller 255. Signals from the operator interface 254 are also directed to the controller 255. The controller 255 is connected to actuators for controlling adjustable elements on the harvester. Feedback signals from the actuators are input to the controller 255.

The actuators controlled by the controller 255 comprise an actuator 280 controlling the rotational speed of the rotary threshing and separating assembly 224, an actuator 282 controlling the clearance of the concave 225, an actuator 284 controlling the opening of a pre-cleaner of the chaffer 227, an actuator 286 controlling the opening width of the chaffer 227, an actuator 288 controlling the opening of the sieve 228, an actuator 290 controlling the speed of the air fan 229, and an actuator 292 controlling the output speed of the hydrostatic transmission and thus the ground speed of the combine. These actuators are known in the art and thus only schematically indicated in FIG. 3.

FIGS. 5 and 6 illustrate grain quality monitoring system 220, an example implementation of grain quality monitoring system 20. System 220 is similar to system 20 except that system 220 is specifically illustrated as carrying out method 100 with respect to images of crops being conveyed along both clean grain elevator 233 and a tailings elevator 231 of combine harvester 200 shown in FIG. 4. FIG. 5 illustrates one example set of hardware of combine harvester 200 that forms grain quality monitoring system 220. As shown by FIG. 5, grain quality monitoring system 220 comprises clean grain image source 294, tailings image source 296, image analyzer 298 as well as controller 255 and operator station display 257, described above. FIG. 6 schematically illustrates components of clean grain image source 294, tailings image source 296 and image analyzer 298.

As shown by FIG. 5, clean grain image source 294 comprises a side passage or bypass 300 along clean grain elevator or conveyor 233, wherein grain, including material other than grain, is siphoned, at a predetermined rate or proportion, across a bypass and across a camera for the capturing of images. In other implementations, clean grain image source 294 comprises a measuring chamber into which grain is filled intermittently and removed. As shown by FIG. 6, clean grain image source 294 additionally comprises bypass fill sensor 308, bypass motor controller 310 and camera 312. Fill sensor 308 comprises a sensor which outputs signals indicating the filling of the bypass 300 (shown in FIG. 5). Bypass motor controller 310 outputs control signals which control the motor that extracts or withdraws grain for sampling from clean grain elevator 233, wherein the withdrawal of grain is at a predefined or predetermined relationship with the amount of grain being conveyed by elevator 233, such that the withdrawn sample corresponds to the full amount of grain being conveyed and accurately reflects the characteristics of the full amount of grain being conveyed. Camera 312 comprises a color camera that captures images of current contents or material filling bypass 300 and outputs image signals which are transmitted to image analyzer 298. In other implementations, camera 312 may comprise other types of cameras. In an alternative implementation, the images from the camera 312 are used by the fill detection module 342 to control the bypass motor controller 310 and the bypass fill sensor 308 is not needed.

Although clean grain image source 294 is illustrated as comprising a bypass 300 through which grain is driven and along which camera 312 captures bulk grain images, in other implementations, clean grain image source 294 is additionally or alternatively provided at other locations along which harvested grain flows to the grain tank. For example, in other implementations, camera 312 is alternatively located directly along elevator 233, rather than within a bypass.

Tailings image source 296 comprises a side passage or bypass 320 along tailings elevator or conveyor 231, wherein tailings are siphoned, at a predetermined rate or proportion, across a bypass and across a camera for the capturing of images. In other implementations, tailings image source 296 comprises a measuring chamber into which grain is filled intermittently and removed. As shown by FIG. 6, tailings image source 296 additionally comprises bypass motor controller 322 and camera 324. Bypass motor controller 322 outputs control signals which control the motor that extracts or withdraws grain for sampling from tailings elevator 233, wherein the withdrawal of tailings is at a predefined or predetermined relationship with the amount of grain being conveyed by elevator 233, such that the withdrawn sample corresponds to the full amount of grain being conveyed and accurately reflects the characteristics of the full amount of grain being conveyed. Camera 322 comprises a color camera that captures images of current contents or material filling bypass 320 and outputs image signals which are transmitted to image analyzer 298. In other implementations, camera 324 may comprise other types of cameras.

Images from clean grain image source 294 and tailings image source 296 are transmitted to image analyzer 298. U.S. Pat. No. 8,831,292 issued on Sep. 9, 2014 to Brueckner et al. entitled METHOD AND ARRANGEMENTS FOR THE OPTICAL EVALUATION OF HARVESTED CROP IN A HARVESTING MACHINE, the full disclosure of which is hereby incorporated by reference, describes image recording systems 52, 52', other examples of clean grain image source 294 and tailings image source 296.

Image analyzer 298 comprises a processor and associated program logic in the form of code, software and/or circuitry that provide instructions to the processor for controlling image sources 294, 296, for analyzing and processing image data received from sources 294, 296 to estimate grain quality. In one implementation, similar to processor 28 and memory 40 described above, image analyzer 298 carries out method 100. In another implementation, image analyzer 298 classifies image samples based upon probabilities that are based upon features calculated irrespective of segment boundaries and features calculated based on identified boundaries of segments as will be described hereafter. The results from image analyzer 298 are transmitted to controller 255, similar to controller 32, to automatically adjust one or more operational parameters of combine harvester 200. In particular, controller 255 transmits adjustment signals to one or more of actuators 280, 282, 284, 26, 288, 290 and 292 based upon such grain quality results. The results from image analyzer 298 are further transmitted to display 257 for presentation to the operator of combine harvester 200.

As shown by FIG. 6, image analyzer 298 comprises video module 340. Image analyzer 298 further comprises fill detection modules 342, 344 and grain quality module 346, 348 for image sources 294, 296, respectively. Video module 340 comprises program logic for receiving image signals from cameras 312, 322 and outputting such images to display 257 described above.

Figure 7A:
FIGS. 7A-7C are images illustrating filling of a bypass of the harvester of FIG. 4.
Figure 7B:
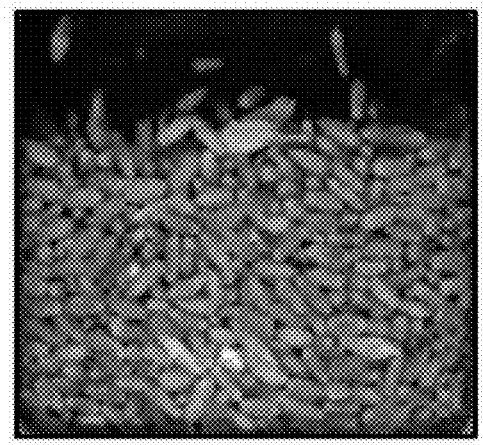
Figure 7C:
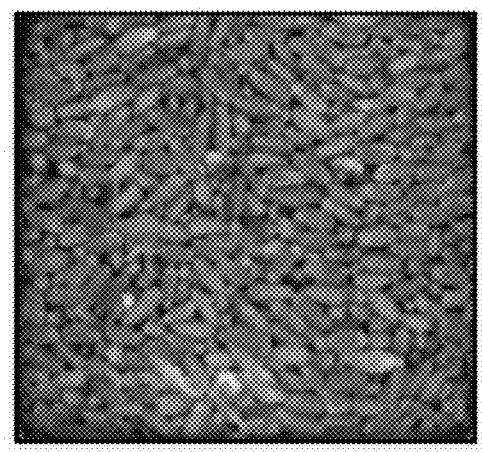

Fill detection modules 342, 344 comprises program logic for analyzing images received from cameras 312, 322 to determine the extent to which bypasses 300, 320 are filled with sample grain or sample tailings for analysis. FIGS. 7A-7C illustrate images of an example bypass 300 along which sampled or extracted grain flows, wherein such figures illustrate complete filling of the bypass 300. Similar image analysis is performed for tailings bypass 320. Based upon an extent to which bypasses 300, 320 are filled, fill detection modules 342, 344 output signals to bypass motor controllers 310, 322, to control or adjust the rate at which grain or tailings are extracted from elevators 233, 231 and conveyed through bypasses 300, 320, respectively. Such closed loop control regarding the filling of bypasses 300, 320 facilitates optimization for fill levels for image processing and classification. In the example illustrated, the control of bypass motor controller 310 is additionally based upon signals from bypass fill sensor 308. In other implementations, bypass fill sensor 308 is omitted, wherein the control of bypass motor controller 310 for bypass 300 is controlled entirely based upon image processing of images received from camera 312.

Grain quality modules 346 and 348 comprise program logic for carrying out method 100. As described above, each of grain quality modules 346, 348 receives images from its associated camera 312, 324. Grain quality modules 346, 348 then apply a filter or feature extractor to such images to extract or compute at least one feature of the bulk grain depicted in the image. Each of grain quality modules 346, 348 further samples values for at least one feature at different selected or sampled sampling locations of the bulk grain image. For each sampling location, grain quality modules 346, 348 determine a probability for at least one classification of material at the sampling location based upon the extracted or calculated feature or features. Grain quality modules 346, 348 determine a quality of the bulk grain of the entire image based upon an aggregate of probabilities for the classification of each of the multiple different sampling locations. The quality results are then transmitted to controller 255 and display 257 (shown in FIG. 5). As noted above, in another implementation, image analyzer 298 classifies image samples using classification probabilities additionally based upon features calculated from image segments as will be described hereafter.

Figure 8:
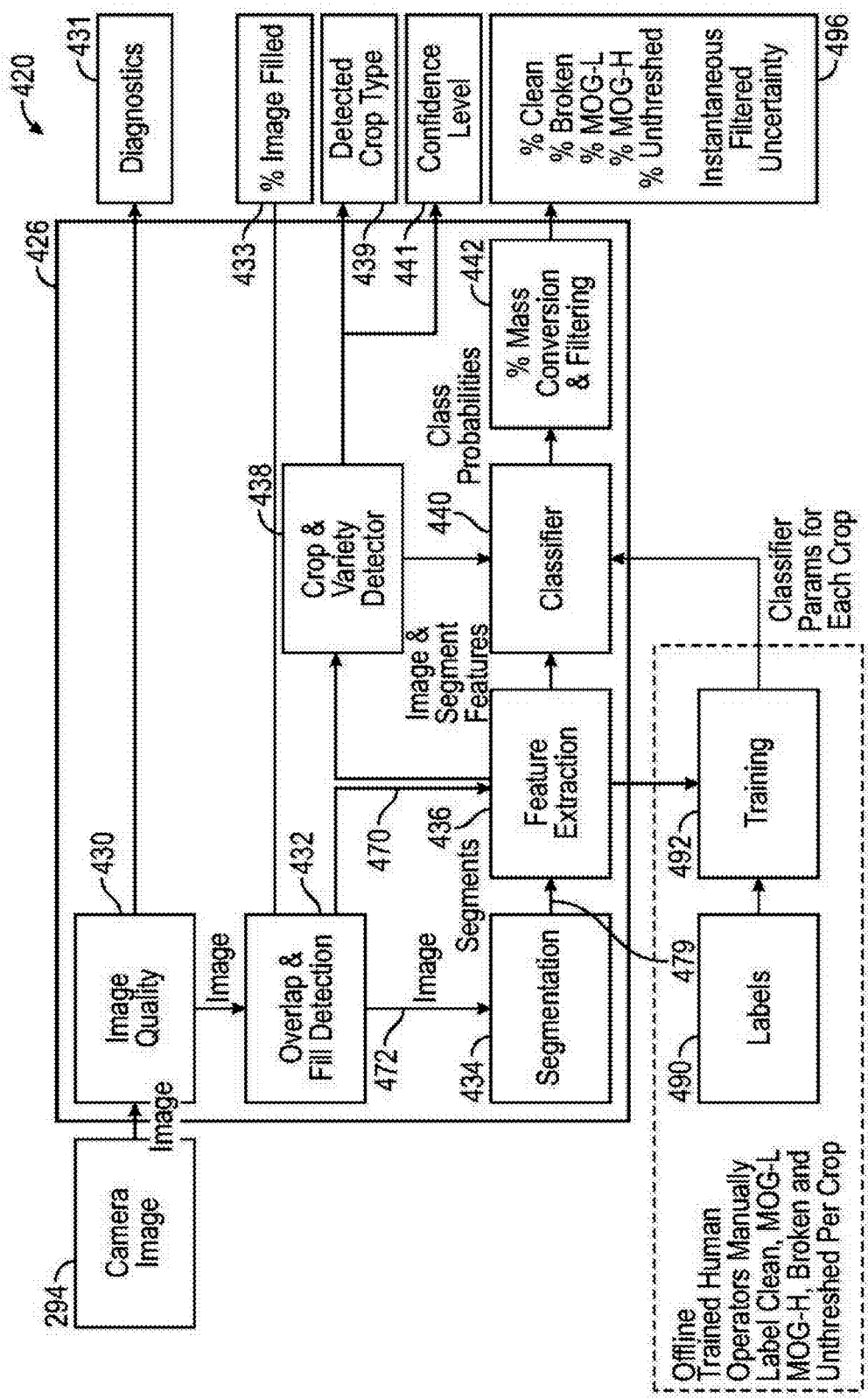
FIG. 8 is a block diagram of another example grain quality monitoring system.

FIG. 8 schematically illustrates grain quality monitoring system 420, another example implementation of grain quality monitoring system 20. Grain quality monitoring system 420 is similar to grain quality monitoring system 20 except that grain quality monitoring system 420 classifies image samples additionally based upon features calculated from image segments. Although grain quality monitoring system 420 is described as determining or estimating grain quality using images captured from a single image source, such as clean grain image source 294 described above, in other implementations, grain quality monitoring system 420 estimates grain quality additionally based upon images from a second image source, such as tailings image source 296, by applying the same image analysis upon images captured from tailings image source 296.

As shown by FIG. 8, grain quality monitoring system 420 comprises bulk grain image source 294, image analyzer 426, controller 255 and display 257 (controller 255 and display 257 being shown in FIGS. 4 and 5). Image analyzer 426 comprises a processor and associated program logic in the form of code, software and/or circuitry, stored in a non-transitory computer-readable medium or memory, that provides instructions to the processor for controlling bulk grain image source 294 and for analyzing and processing image data received from source 294 to estimate grain quality. Image analyzer 426 comprises image quality module 430, overlap and fill detection module 432, segmentation module 434, feature extraction module 436, crop and variety detector 438, classifier or classification module 440 and conversion and filtering module 442.

Image quality module 430 directs processor 28 in analysis of the quality of bulk grain images received from image source 294. Image quality module 430 analyzes such images to identify or detect circumstances which may impair the quality of such images such as bad focus, bad lighting, bad color, material stuck on the glass window through which images are captured, smudges on the glass, moisture in the glass or dirt on the glass. The outputted diagnostics 431 are presented on display 257. In one implementation, in response to detecting poor image quality in particular areas of the bulk grain image, image quality module 430 warns an operator of such bad areas or of the extent of such bad areas if the images exceeds the predefined threshold. In one implementation, image quality module 430 takes additional remedial action such as digitally masking out poor quality areas of such images. In some implementations, image quality module 430 is omitted.

Overlap and fill detection module 432 analyzes bulk grain images received from image source 294 to perform two main functions: monitoring and controlling filling of bypass 300 (shown in FIG. 5) and tracking of bulk grain movement through bypass 300. As discussed above with respect to fill detection module 342 in FIG. 6, module 432 analyzes images received from source 294 to determine the extent to which bypass 300 is filled with bulk grain. Based upon intensity gradients and other image characteristics, module 432 determines the extent to which bypass 300 is filled with bulk grain. The result is the output of a percent fill signal 433 indicating the percent of the bulk grain image that is filled with bulk grain. Based on the detected fill of bypass 300, module 432 direct processor 28 to output control signals controlling operation of bypass motor controller 310. In one implementation, module 432 outputs signals when bypass unit has been sufficiently filled such that only images taken when bypass 300 has been sufficiently filled are utilized for grain quality analysis. In another implementation, module 432 identifies unfilled portions of a bulk grain image and outputs a signal such that empty portions of the bulk grain image are not evaluated or processed.

Module 432 further tracks movement of grain across bypass 300 to identify overlapping of bulk grain images and avoid double counting of the same bulk grain sample. In one implementation, module 432 assumes mostly linear motion of bulk grain across bypass 300 and across camera 312 (shown in FIG. 6). Module 432 analyzes sequential images and generates correlation scores for portions of bulk grain images. Based upon the correlation scores, module 432 identifies overlapping portions of such images, wherein such overlapping portions are not double counted. As a result, the load on processor 28 is reduced.

Figure 9A:
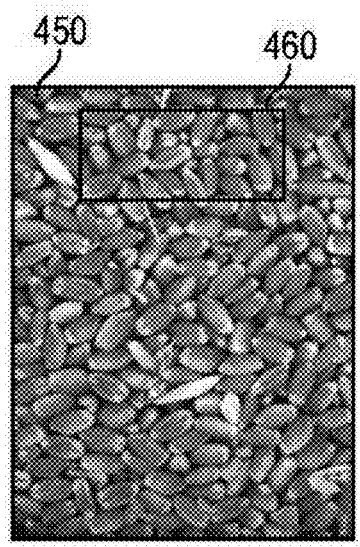
FIGS. 9A-9C are images illustrating bulk grain image overlap detection.
Figure 9B:
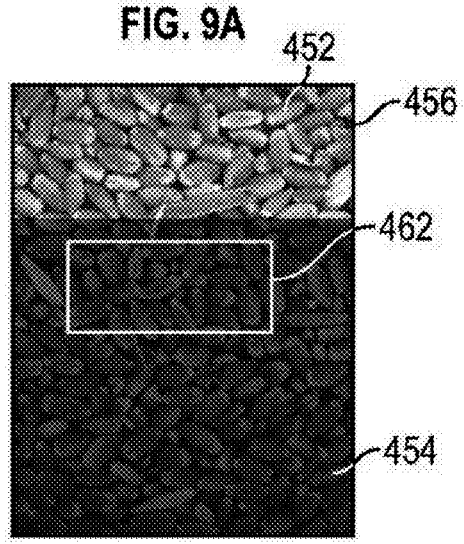
Figure 9C:
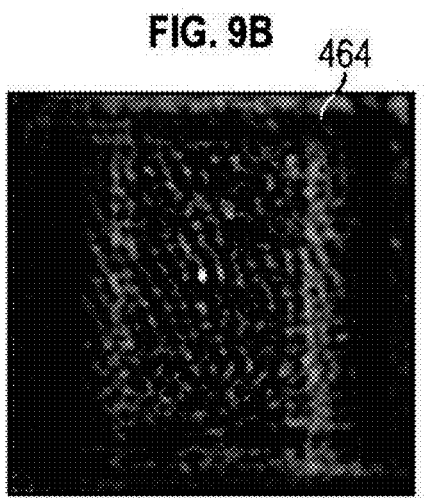

FIGS. 9A-9C illustrate one example of such bulk grain tracking FIG. 9A illustrates a first bulk grain image 450 of wheat received by image analyzer 298. FIG. 9B illustrate a second bulk grain image 452 of wheat received by image analyzer 298, wherein image 9B comprises an old fraction 454 and a new fraction 456. Old fraction 454 comprises the portion of an image that has already been captured and has undergone or is currently undergoing analysis. New fraction 456 comprises newly received bulk grain that has not yet been previously captured and utilized for grain quality analysis. Module 432 compares one or more selected portions 460 of image 450 with portions of image 452 to identify those portions of different images that sufficiently match such that such portions of the images are deemed as being overlapping and redundant. In one implementation, module 432 compares different images to produce correlation diagram 464 such as shown in FIG. 9C in which correlation is indicated by brightness and those portions having a brightness above a predefined threshold are deemed as being overlapping portions of different images. Based upon correlation indicators or results between portions 460 and 462, module 432 identifies movement of the same portion of grain to identify or estimate boundaries between old fraction 454 and new fraction 456 of each of the bulk grain images received from bulk grain image source 294. In some implementations, such overlap detection or grain tracking by module 432 is omitted.

As indicated by arrow 470, new fractions 456 of the bulk grain image are directly analyzed by feature extraction module 436. As indicated by arrow 472, the same new fractions 456 of the bulk grain image are additionally segmented by segmentation module 434 before being analyzed by feature extraction module 436. Feature extraction module 436 extracts features from both the bulk grain image as a whole (as described above with respect to block 106 of method 100) and from segments of the bulk grain image. In an alternate implementation, the entire image 452 is analyzed by feature extraction module 436 and segmented by segmentation module 434 instead of only the new fractions 456.

Figure 10A:
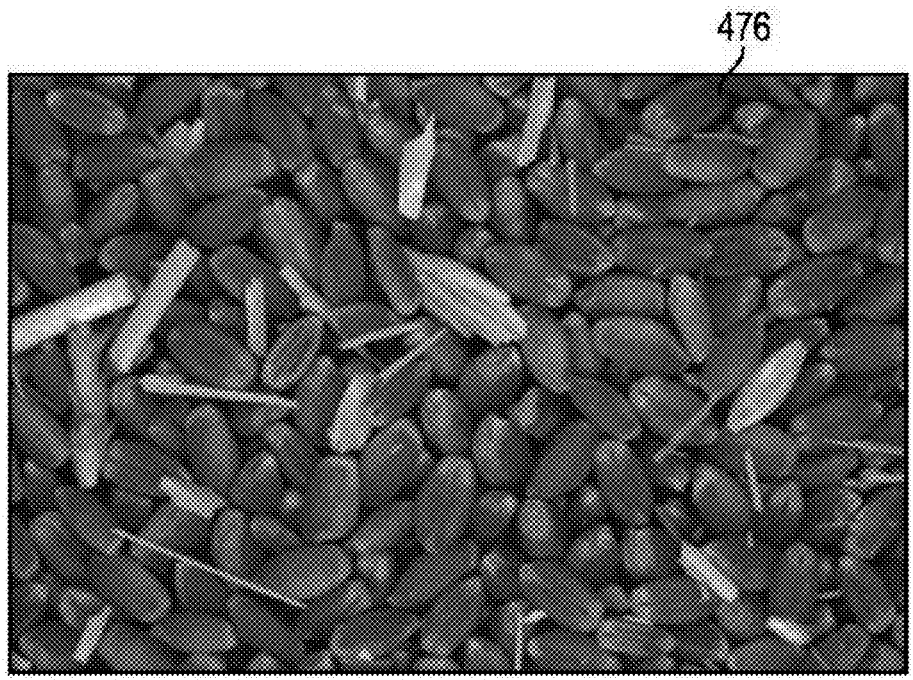
FIG. 10A is an example bulk grain image.
Figure 10B:
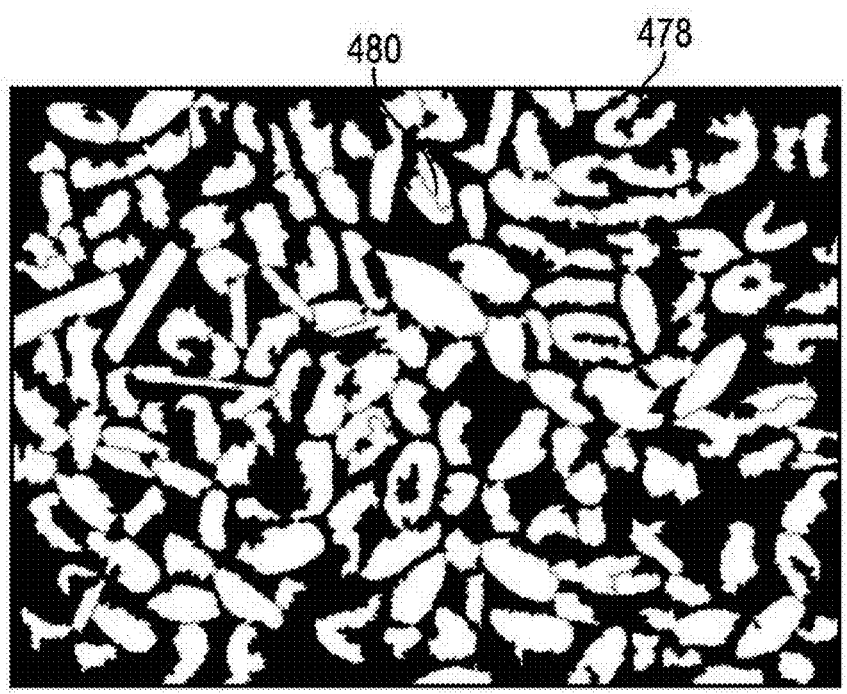
FIG. 10B is an image illustrating segmentation of the bulk grain image of FIG. 10A.

Segmentation module 434 performs segmentation upon the received bulk grain image. During segmentation, module 434 carries out image processing or analysis to estimate boundaries of distinct pieces, particles or objects, referred to as segments, in the bulk grain image. FIG. 10A illustrates an example bulk grain image 476 of wheat. For purposes of illustration, FIG. 10B conceptually illustrates segmentation of image 476 to produce segmented image 478, identifying the perimeter or boundaries of different objects 480, wheat and distinct objects, pieces or particles other than wheat, in the bulk grain image 476. FIG. 10B conceptually depicts and visibly distinguishes examples of different segments that are calculated or identified by segmentation module 434. In one implementation, segmentation module 434 discards those portions of image 476 that are not identified as being within the perimeter boundaries of a segment. As indicated by arrow 479, the segments identified by segmentation module 434 are transmitted to feature extraction module 436 for analysis. In another implementation, segment module 434 identifies those portions of image 476 that are not identified as being within the perimeter boundaries of a segment such that features are not extracted from such non-segment portions of image 476.

Figure 11A:
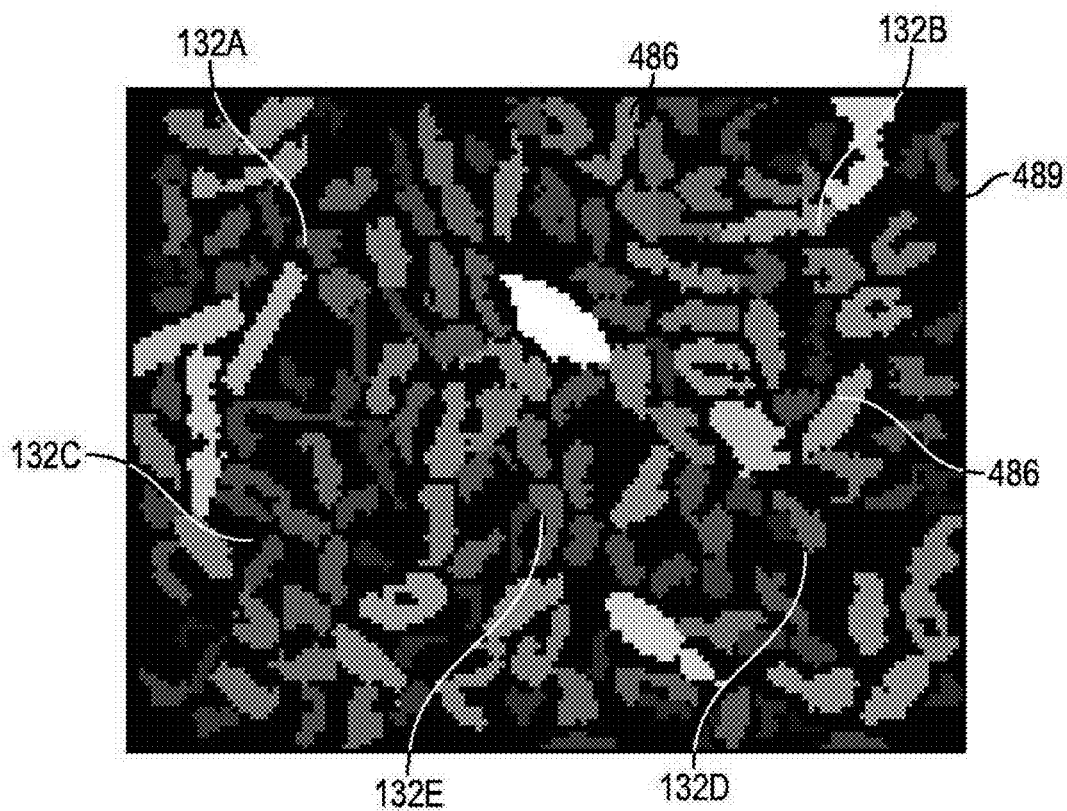
FIG. 11A is an image illustrating segmentation of the bulk grain image of FIG. 10A and application of a first feature extractor to extract first features of segments.

Feature extraction module 436 extracts image features from the bulk grain image received from overlap and fill detection module 432 and segment features from the identified segments from the same bulk grain image received from segmentation module 434. Extraction of image features from the bulk grain image is described above with respect to feature module 50 in FIG. 1; block 104 in FIG. 2; and the example image feature extraction shown in FIGS. 3B-3E above. Feature extraction module 436 further extracts features from the segments in the segmented bulk grain image received from segmentation module 434. FIG. 11A illustrates application of a feature extractor by feature extraction module 436 to form feature extracted segmented bulk grain image 489, which illustrates extracted values for a particular feature for each of the segments in the bulk grain image 476. In the example illustrated, segmentation of the bulk grain image 476 results in the identification of individual segments 486, wherein the boundaries of such segments 486 are identified. In the example illustrated, feature extraction module 436 applies a feature extractor that is based on the computed area of a segment. The different values for the extracted feature are illustrated with different brightness levels in the diagram of FIG. 11B, wherein individual segments having feature values falling within a predefined associated range are illustrated with a particular brightness.

Figure 11B:
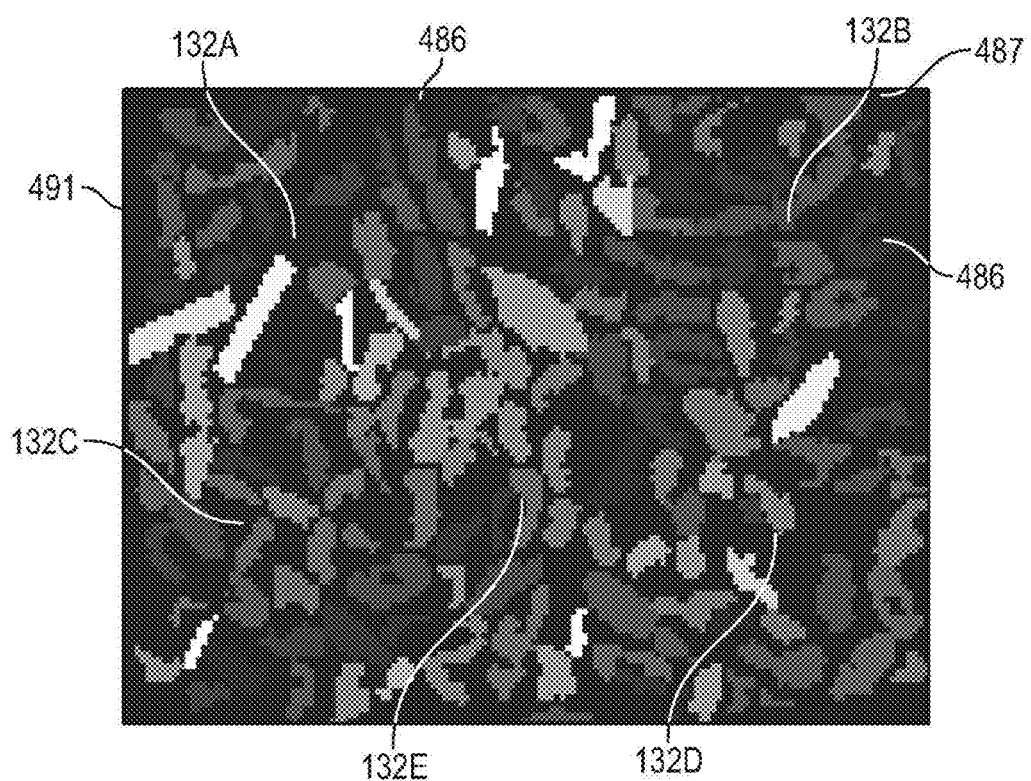
FIG. 11B is an image illustrating segmentation of the bulk grain image of FIG. 10A and application of a second feature extractor to extract second features of segments.
Figure 12:
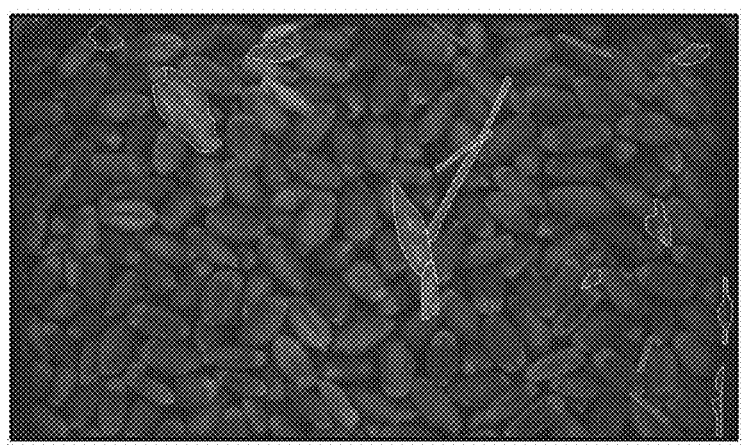
FIG. 12 is an example of a material class labeled bulk grain image of wheat.
Figure 13:
FIG. 13 is an example of a material class labeled bulk grain image of corn.
Figure 14:
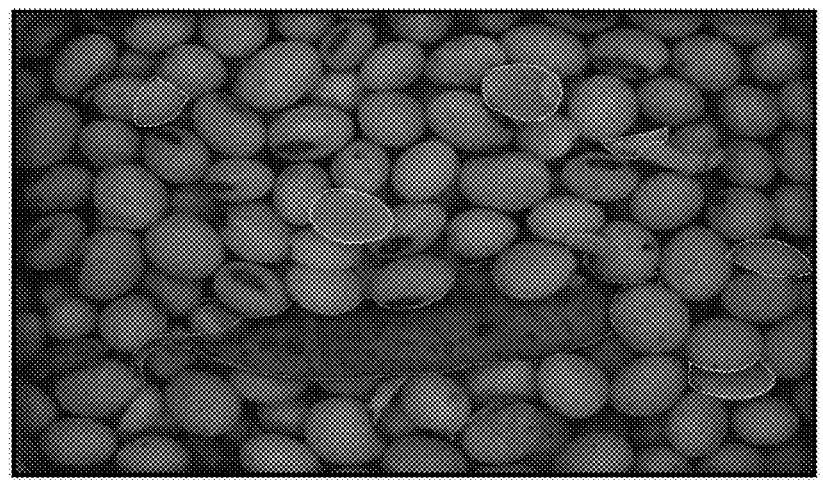
FIG. 14 is an example of a material class labeled bulk grain image of soybeans.
Figure 15:
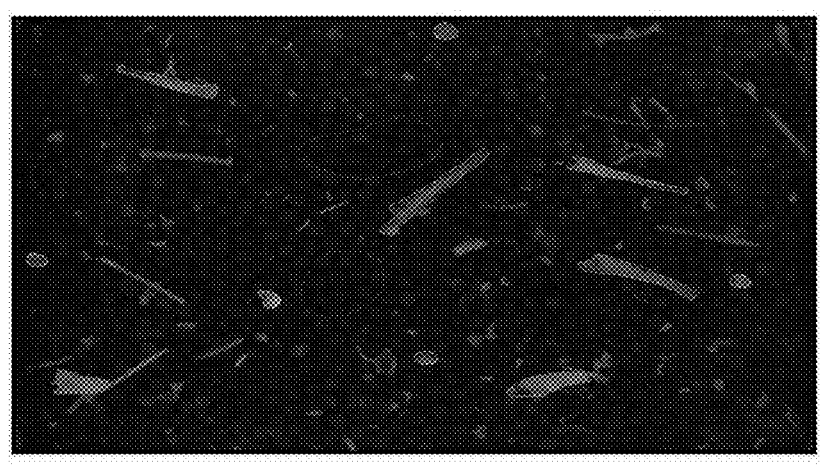
FIG. 15 is an example of a material class labeled bulk grain image of canola.

FIG. 11B illustrates the application of a different feature extractor to the identified segments 486 of the bulk grain image 476 of FIG. 10A to form feature extracted segmented bulk grain image 491. In the example illustrated, feature extraction module 436 applies a feature extractor that computes the contrast of the intensity of all the pixels in bulk grain image 476 that fall within a particular segment. In the feature extracted segmented bulk grain image of FIG. 11B, the contrast value of each segment is illustrated by a different brightness level, wherein those segments having values falling within a predefined associated range are illustrated with a particular brightness. FIGS. 11A and 11B illustrate just two example feature extractors that may apply to the identified segments based on characteristics of the segments and/or the pixels within the segments. In other implementations, different or additional feature extractors are applied to the segments identified in the bulk grain image. Examples of such segment features which may be extracted from the segments of the bulk grain image include, but are not limited to, roundness, convexity, contour length, major and minor axes, min/max brightness within the segment, surface fitting to the intensities within the segment, and variance in brightness and color within the segment. The extracted feature or features from feature extraction module 436 based upon both the bulk grain image and the individual segments identified in the bulk grain image are transmitted to crop and variety detector module 438 and classification module 440 for further analysis.

As shown by FIGS. 11A and 11B, each of the individual pixels contained within the boundary of an identified segment is assigned the same set of feature values. For example, if the extracted feature comprises a shape or size characteristic of an identified segment, such as the area of a segment, the identified value for the shape or size of the segment is assigned to each of the pixels within the boundary of the identified segment. In circumstances where the feature being extracted is based not only on the boundaries of a segment but also on characteristics that vary from pixel to pixel within the boundaries of the identified segment, each of the pixels within the boundaries of the identified segment are assigned the same single value based upon or derived from the different values of the different individual pixels within the boundaries of the identified segment. For example, in one implementation, an average, median, largest observation, smallest observation or other statistic derived from the values of the different pixels within the boundaries of the segment is assigned to each of the pixels within the boundaries of the associated segment.

Crop and variety detector module 438 analyzes the values for the one or more features extracted by feature extraction module 436 for the segments identified in the feature extracted segmented bulk grain images and the feature filtered bulk grain images to identify the type of the particular crop and possibly the particular variety of the crop presently being harvested. The determined or identified crop type and variety are output as signals 439 for recording with the particular associated geo-referenced locations currently being traversed by harvester 200. In one implementation, the determined or identified crop type and variety are further displayed on display 257. For example, a field may be planned with multiple crop types or multiple varieties. Crop and variety detector module 438 detects changes in the crop type and variety as the harvester is crossing the field and records changes in crop variety and type with respect to different geo-referenced locations in the field. In one implementation, the grain quality results may further be stored and associated in memory with the particular identified crop variety and type as well as the particular geo-referenced locations in the field. In one implementation, the detected crop type is output to the controller 255 (shown in FIG. 5) so that the controller can change its control strategy based on the detected crop type.

In one implementation, the detected crop type is used by the classification module 440 to choose from a set of crop specific parameters. For example, in one implementation, based upon the detected crop or the detected variety of crop being harvested, classification module 440 accesses lookup tables or utilizes mathematical relationships linking or corresponding calculated feature values and probabilities for classification of materials. For example, in one implementation, classifier 440 consults a first lookup table or utilizes a first mathematical relationship of feature values to probabilities to determine a probability that a particular material classification exists at a particular sampling location for a first identified crop such as corn. In contrast, classifier 440 consults a second different lookup table or utilizes a second different mathematical relationship of feature values to probabilities to determine a probability that a particular material classification exists at a particular sampling location for a second identified crop such as wheat, soybeans, barley, canola, oats or the like.

In yet other implementations, the crop and variety detector module 438 is excluded or is manually overridden, wherein the user specifies the crop type to classification module 440. In yet another implementation, the crop and variety detector module 438 is excluded and the classification module 440 uses generic parameters/lookup tables/ mathematical relationships linking feature values to classification probabilities, wherein a single lookup table or a single mathematical relationship or formula is utilized for a particular class of material, such as MOG light, MOG heavy, clean grain and the like, across all crop types.

In one implementation, crop and variety detector 438 additionally compares the values received from feature extraction module 436 for one or more features to normal, typical or standard values or ranges of values to determine a degree or level of confidence that the particular feature values received from module 436 are actually for the crop that is being harvested. In such an implementation, crop and variety detector 438 outputs signals representing a confidence level indication 441. In one implementation, the confidence level 441 is used by the controller 255 to change how it interprets the signals 496 indicating quality of grain. In another implementation, the confidence level indication 441 is presented on display or other output to an operator. For example, in one implementation, in circumstances where the values for the features received from module 436 are so different from typical feature values for the crop being harvested, detector 438 will output signals indicating an extremely low level of confidence for the results ultimately presented by system 420. In one implementation, if the differences between the feature values received and the expected feature values exceed a predefined threshold, a warning indication may be displayed or audibly presented to the operator. Such a difference resulting in a low confidence level may be the result of the operator inputting the wrong crop type or the harvester temporarily traversing an abnormal region of a field containing an abnormal patch of plants.

Classification module 440 operates similar to classification module 54 as described above except that classification module 440 determines the probability for the presence of a particular material classification at each of the different sampling locations additionally based upon the value for a single feature or based upon values of multiple features at each sampling location of the feature extracted segmented images. For example, in one implementation, classification module 440 determines the probability for the presence of MOG at sampling location 132A based upon the value for a first feature at the corresponding sampling location 132A in feature image 122 (FIG. 3B), the value for a second feature at the corresponding sampling location 132A in feature image 124 (FIG. 3C), the value for a third feature at the corresponding sampling location 132A in feature image 126 (FIG. 3D), the value for a fourth feature at the corresponding sampling location 132A in feature image 130 (FIG. 3E), as well as the value for a fifth feature at the corresponding sampling location 132A in segmented feature extracted image 489 (FIG. 11A) and the value for a sixth feature at the corresponding sampling location 132A in the segmented feature extracted image 491 (FIG. 11B).

Similar to classification module 54, classification module 440 determines a probability, as described above, for a particular classification at each of a multitude of different sampling locations. For example, classification module 440 (1) determines a first probability for the presence of a particular material classification, such as MOG, at sampling location 132A, (2) determines a second probability for the presence of the same particular material classification, such as MOG, at sampling location 132B, (3) determines a third probability for the presence of the same particular classification, such as MOG, at sampling location 132C, and so on for each sampling location. Although FIG. 3A illustrates five sampling locations 132, in other implementations, classification module 54 may determine classification probabilities at a greater or fewer of such sampling locations.

In one implementation, classification module 440 directs processor 28 to determine a probability for each of multiple different material classifications at each sampling location 132. For example, in one implementation, classification module 440 assigns each sampling location a probability for each of a plurality of different classifications. For example, classification module 440 may assign the sampling location a probability of x % that the image sample is depicting a first classification of material and a probability of z % that the sampling location is depicting a second classification of material and so on, wherein the sum of the probabilities does not exceed 100%. For example, in one implementation, classification model 440 directs processor 28 to determine a probability for the presence of a first material classification, such as broken grain, at a sampling location as well as a probability for the presence of a second different material classification, such as MOG, MOG heavy or MOG light, at the same sampling location.

In one implementation, classification module 440 consults a predetermined lookup table containing different values for different combinations of features, and different probabilities for different classifications of materials corresponding to the different values for the different combinations of features. As noted above, in one implementation, a specific lookup table is dedicated for each crop type or for each different variety of crop. In another implementation, multiple tables are utilized, wherein each specific lookup table is used for a specific set or group of related crops or related varieties. In other implementations, a generic lookup table is utilized across all crop types or across all varieties. In one implementation, probability entries in the lookup table are generated by taking multiple grain samples, capturing an image of each of the multiple grain samples, and having experts or trained human operators label different parts of the image to form labeled images 490. FIGS. 12-15 illustrate captured bulk grain images of wheat, corn, soybeans and canola that have been labeled by human operators for use in generating different lookup tables for each of the different crop types. The labeled bulk grain images are digitally input and stored for use by training module 492. In an alternate implementation, a mathematical relationship is used instead of a lookup table.

Training module 492 comprises a processor and associated program logic which direct generation of a lookup table or mathematical relationship through machine learning by using a large list of feature vectors and label pairs. As part of such training, feature extraction module 436 applies filters and feature extractors to the labeled bulk grain images to extract feature vectors for each sampling location of the labeled bulk grain image. Subsequently, training module 492 uses the label at each sampling location to determine the desired probabilities of the material at that sampling location and associates these desired probabilities with the set of extracted features at that sampling location. Such probabilities and corresponding set of feature vectors are stored as part of the lookup table subsequently used by classification module 440 when analyzing grain quality. In an alternate implementation, a mathematical relationship between feature vectors and probabilities is generated and stored instead of a lookup table.

In the example illustrated, classification module 440 is operable in one of various modes selectable by a user of system 420, wherein system 420 analyzes bulk grain for different classifications of material. Examples of different classifications of material for which classification module 440 makes a prediction with regard to each sampling location include, but are not limited to, one or more ranges regarding material other than grain (MOG), such as MOG light, MOG heavy or other classifications such as hull, broken, sticks, stock, cobs, stems, pods, unthreshed grain, skinned grain, and clean grain. In other implementations, classification module 440 may predict other classifications of material depending upon a particular grain type and the particular plant from which the grain is harvested. The probabilities for such other classifications are provided in lookup tables or mathematical relationships that are generated similarly to the generation of the lookup table or mathematical relationship described above with respect to labels 490 and training module 492.

Conversion and filtering module 442 converts or maps the image sample classification probabilities across the entire bulk grain image received from classification module 440 to a percent by weight output for different classifications of materials in the bulk grain. Conversion and filtering module 442 determines and outputs a signal or signals 496 indicating quality of grain for the bulk grain image based upon an aggregate of the probabilities, for the particular material classification, of the different image samples constituting the bulk grain image. In the example illustrated, module 442 outputs, to display 257 and controller 255, grain quality information such as percent by mass/weight clean, percent by mass/weight broken, percent by mass/weight material other than grain light, percent by mass/weight material other than grain heavy and percent by mass/weight unthreshed. In one implementation, module 442 further calculates statistics regarding such grain quality results, wherein instantaneous, filtered, and the uncertainty in the measurements are calculated for display, machine control, and storage.

Figure 16:
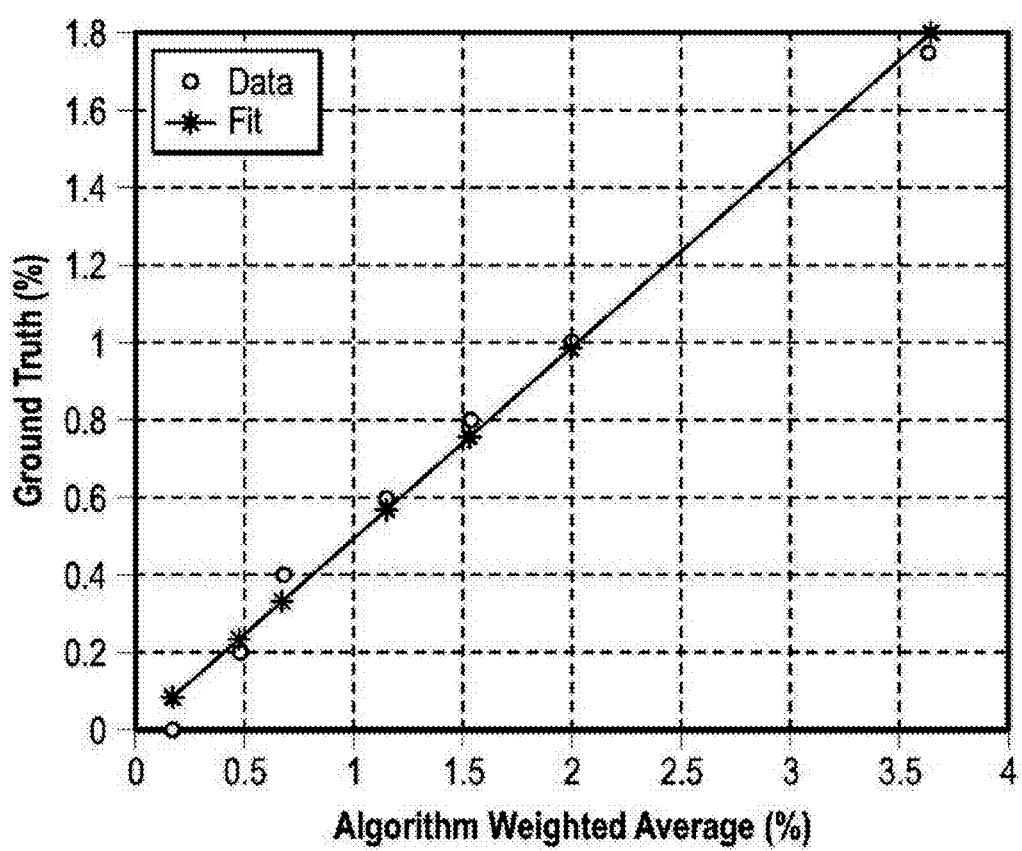
FIG. 16 is a graph of an example calibration function, a linear curve mapping an aggregate of probabilities from multiple image samples for a class of material in a bulk grain image to a percent by weight for the class of material.

In the example illustrated, conversion and filtering module 442 applies a calibration function to a statistic derived from an aggregate of the different classification probabilities of the different image samples. In one implementation, module 442 converts image sample classification probabilities across an image to a percent by mass/weight for a classification of material for the image by applying a calibration function in the form of a linear curve which maps average classification probability across the bulk grain image to a ground truth percent by weight or percent by mass for the classification of material. FIG. 16 illustrates an example linear curve mapping average of classification probability outputs across the bulk grain image or across multiple bulk grain images (algorithm weighted average) to the ground truth percent by mass or percent by weight percentage (ground truth) for an example class of material, such as unthreshed grain for a crop such as wheat. During run time of harvester 200, conversion module 442 averages the classification probabilities of the different image samples across one or more bulk grain images and converts the averages to percent by mass or percent by weight values using the conversion relationship represented by the linear curve.

Figure 17:
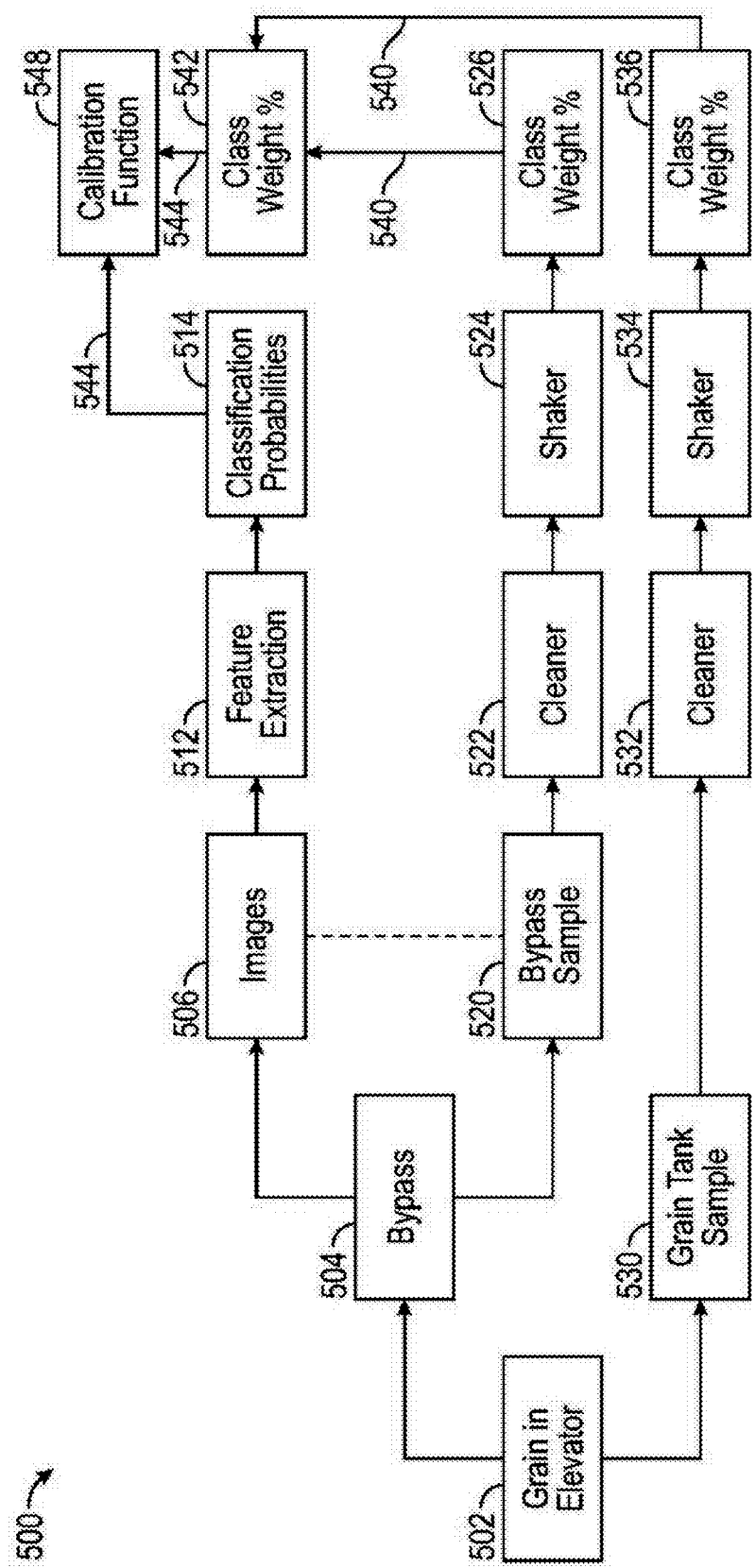
FIG. 17 is a flow diagram of an example method for forming a calibration function to convert class probabilities to class weight percentages.

FIG. 17 illustrates example methods by which a calibration function, such as the example calibration function shown in FIG. 16, is calculated or determined. FIG. 17 is a flow diagram illustrating an example method 500 for the generation of a calibration function, using ground truth values, to be used in converting aggregate classification probabilities into percent by weight values. As indicated by blocks 502, 504, a sample of grain in grain elevator 233 is removed and transmitted across bypass 300. As indicated by block 506, images of the bypass sample are taken. As indicated by blocks 512 and 514, features are extracted or calculated from each image, wherein material classification probabilities are determined and assigned to each sampling location as described above with respect to classification module 440.

In one implementation, as indicated by block 520, the bypass grain sample from which the images in block 506 were obtained is then separated into different material components, such as by passing the actual bypass grain sample through a cleaner in block 522 and a shaker in block 524. As indicated in block 526, actual values for the percent by weight for the different classifications of material are measured.

In an alternative implementation, as indicated by block 530, in lieu of utilizing images captured from a bulk grain bypass, the calibration function is alternatively determined using a sample taken from the grain tank, such as from the grain tank of the harvester, during the general time at which the grain for the bypass sample was acquired. As indicated by blocks 532 and 534, this grain tank sample is also separated into different material components, such as by passing the actual grain tank sample through a cleaner in block 532 and a shaker in block 534. As indicated by block 536, actual values for the percent by weight for the different classifications of material are measured.

As indicated by arrows 540, the actual percent by weight values for the different classifications of material determined in blocks 526 and/or 536 can be used as ground truth percent by weight 542 to determine a calibration function 548. As indicated by arrows 544, a relationship between the ground truth percent by weight 542 for each class of material and the aggregate of the different classification probabilities of the different image samples is determined. This relationship is defined and used to identify a calibration function 548, such as the example calibration function shown FIG. 16, for use in subsequent run time conversion of aggregations of the different classification probabilities of different images to percent by weight values for the different classes of material.

In yet another implementation, in lieu of determining actual class mass/weight percentages from bulk grain samples drawn from a harvester bypass (block 504) or alternatively drawn from the grain tank (block 530), the calibration function is alternatively determined using engineered grain samples with known amounts of each type of material, wherein the grain samples are processed to get a system response and wherein the calibration function, such as a linear curve mapping aggregate classification probability outputs to ground truth mass or weight percentage, is generated.

In one implementation, module 442 further applies filters over multiple instantaneous output signals 496, such as applying a simple weighted moving window filter that accounts for image overlap, resulting in filtered output signals 496. In one implementation the weights in the filter are dependent on time. In an alternate implementation, the filter weights are dependent on the amount of material that has moved past the imager, as computed by the overlap and fill detection module 432.

In one implementation, module 442 further produces estimates of the uncertainty in the output signals 496 using the classification probabilities generated by the classifier 440. For example, an image of bulk grain that contains image samples classified as MOG light with very high probability and all other classes with very low probability will result in a low uncertainty output signal. Conversely, an image of bulk grain that contains image samples classified with some probability as MOG light and some probability as unthreshed will result in a higher uncertainty signal. In another implementation, the amount of variance in the instantaneous output signal computed from individual images of bulk grain is used to determine the uncertainty output signal 496. In one implementation, the uncertainty output signal 496 is used by the controller 255 to change how it interprets the instantaneous and/or filtered signals 496 indicating quality of grain.

Figure 18:
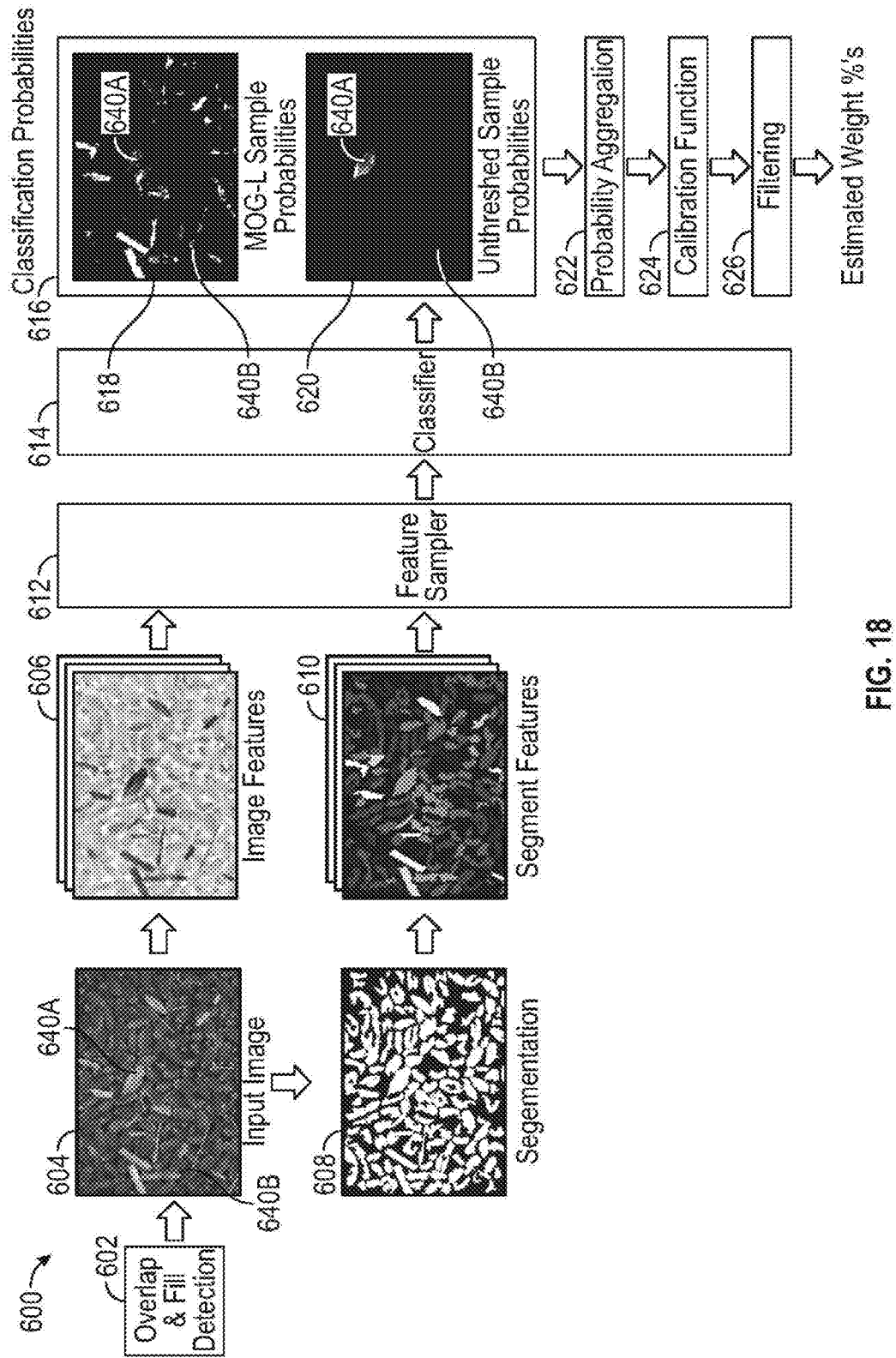
FIG. 18 is a flow diagram of an example method for monitoring grain quality.

FIG. 18 is a functional flow diagram of an example method 600 for monitoring grain quality. Method 600 is carried out by system 420 illustrated in FIG. 8. As indicated by block 602, overlap and fill detection module 432 receives images of bulk grain and analyzes such images to determine overlap of consecutive images and to identify images that are not completely filled with grain. Once an image 604 suitable for analysis has been identified—being full of grain or having empty image portions cropped and accounting for overlap with previous images—feature extraction module 436 applies feature extractors to the image 604 to extract or calculate a stack of different features 606, which are irrespective of segment boundaries, from the bulk grain image 604. Segmentation module 434 performs segmentation on the same image 604 to produce a segmentation 608 of the bulk grain image 604. Feature extraction module 436 then applies different feature extractors to extract or calculate a stack of different features 610 from the segmentation 608 and the bulk grain image 604. As indicated by block 612, classification module 440 combines the stack of features 606 and 610 to form feature vectors for each of multiple sampling locations taken from bulk grain image 604. As indicated by block 614, classifier module 440 determines a classification score, namely, classification probabilities 616 for each sampling location of the overall image 604 based upon the feature vectors in each bulk grain image. FIG. 18 illustrates example sampling location probabilities for MOG light 618 and unthreshed 620 material classifications using sampling locations aligned on a regular grid of every fourth pixel in the x and y directions of the input image 604. In this illustration, sampling locations with high probabilities for that material classification are shown as bright and low probabilities are shown as dark. Such classification probabilities are at the level of a sampling location, and not at the level of a segment or "particle" as defined by boundaries of the segment or "particle". As a result, classification probabilities generally vary across objects in the bulk grain image, as illustrated by the varying brightness in 618 and 620 across sampling locations that fall within a single object in bulk grain image 604. As an additional result, multiple classes of material may have probabilities at the same sampling location, as illustrated by the medium brightness in sampling location 640A of both MOG light 618 and unthreshed 620, showing classification uncertainty at those sampling locations. Furthermore, because the classifier 614 incorporates image features 606 irrespective of segment boundaries and generates classification probabilities at sampling locations independent of segments, portions of objects in the bulk grain input image 604 can be correctly classified even if those objects are not present in the segmentation 608, as shown by the probability 618 of the thin piece of MOG light at sampling location 640B.

As indicated by block 622, module 442 aggregates the classification probabilities from all the sampling locations in the image. As indicated by block 624, module 442 applies a calibration function to the aggregated sample probabilities to determine a percent by mass/weight value for the class of material for the entire image 604. As indicated by block 626, module 442 further applies filtering to output an estimate of weight percentages for classes of material. Such estimates of weight percentages include, but are not limited to, percent by weight clean grain, percent by weight broken grain, percent by weight material other than grain light, percent by weight material other than grain heavy and percent by weight unthreshed grain. In one implementation, the output signals additionally include uncertainty estimates of the weight percentages.

In one implementation, the same process described above with respect to FIG. 18 is applied to bulk grain images received from bulk grain image source 296, which provides images of tailings. In such an implementation, segmentation of an image and the extraction of segment features may be excluded due to the expected large amount of overlapping material other than grain. In one implementation, the monitoring of tailings produces percent by weight for classifications of materials comprising "free grain" and/or classifications of materials comprising "tailings/MOG-light". In one implementation, the monitoring of tailings additionally produces results for classification of materials comprising "unthreshed grain". In yet another implementation, monitoring of tailings additionally produces results for an "empty" class when a tailings image is partially empty.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising: capturing an image of bulk grain; applying a feature extractor to the image to determine a feature of the bulk grain in the image; for each of a plurality of different sampling locations within the image, determining, based upon the feature of the bulk grain at the sampling location, a classification score for presence of a classification of material at the sampling location; and outputting a signal indicating quality of the bulk grain of the image based upon an aggregate of the classification scores of the different sampling locations; for each of the plurality of different sampling locations in the image, determining, based upon the plurality of features of the bulk grain at the sampling location, a classification score for the presence of a second classification of material at the sampling location, wherein the signal indicating quality of the bulk grain of the image is based upon an aggregate of the classification scores for the presence of the second classification of material at each of the sampling locations, and adjusting operational settings of a harvester based upon the signal.

2. The method of claim 1 comprising applying a plurality of feature extractors to the image to determine a plurality of features of the bulk grain in the image, wherein the classification score for the presence of the classification of material at the sampling location is based upon the plurality of features of the bulk grain at the sampling location.

3. The method of claim 1 further comprising:
segmenting the image into segments defined by presumed boundaries of individual bulk grain elements;
determining a feature of each segment, wherein the classification score for the presence of the classification of material at each sampling location is additionally based upon the feature of each segment at each sampling location.

4. The method of claim 1 further comprising:
segmenting the image into segments defined by presumed boundaries of individual bulk grain elements;
applying a plurality of feature extractors to each of the segments to determine a plurality of features for each segment, wherein the classification score for the presence of the classification of material at each sampling location is additionally based upon the plurality of features of each segment at each sampling location.

5. The method of claim 1 further comprising:
for each of a plurality of different sampling locations in the image, determining, based upon the feature of the bulk grain at the sampling location, a classification score for the presence of a second classification of material at the sampling location; and
outputting a signal indicating quality of the bulk grain of the image based upon an aggregate of the classification scores for the presence of the second classification at each of the sampling locations.

6. The method of claim 1 further comprising outputting a signal indicating a confidence level in the signal indicating quality of the bulk grain of the image.

7. The method of claim 1, wherein the classification of material is selected from a group of classifications of material consisting of: clean grain, broken grain, material other than grain-light, material other than grain-heavy, and unthreshed grain.

8. The method of claim 1 further comprising applying a calibration function to the aggregate of the classification scores to determine a percent by weight of material having the classification for the image, wherein the signal is based upon the determined percent by weight of the material having the classification for the image.

9. The method of claim 1, wherein the signal is based upon a time or material flow weighted filter of a plurality of the aggregate of classification scores for the classification from multiple images of bulk grain.

10. A non-transitory computer-readable medium containing program logic to direct a processor to: receive signals corresponding to a captured image of bulk grain, the captured image comprising (A) multiple individual bulk grain elements that are partially overlapped by other bulk grain elements or that are partially overlapping other bulk grain elements and (B) non-grain elements selected from a group of non-grain elements consisting of: chaff, hulls, cobs, stems and pods; apply a feature extractor to the image to determine a feature of the bulk grain in the image; for each of a plurality of different sampling locations in the image, determine, based upon the feature of the bulk grain at the sampling location, a classification score for the presence of a classification of material at the sampling location; and output a signal indicating quality of the bulk grain of the image based upon an aggregate of the classification scores for the presence of the classification of material at each of the different sampling locations; for each of the plurality of different sampling locations in the image, determining, based upon the plurality of features of the bulk grain at the sampling location, a classification score for the presence of a second classification of material at the sampling location, wherein the signal indicating quality of the bulk grain of the image is based upon an aggregate of the classification scores for the presence of the second classification of material at each of the sampling locations, wherein the signal is based upon a time or material flow weighted filter of a plurality of the aggregate of classification scores for the classification from multiple images and adjusting operational settings of a harvester based upon the signal.

11. The non-transitory computer-readable medium of claim 10, wherein the program logic is further configured to direct the processor to:
segment the image into segments defined by presumed boundaries of individual bulk grain elements;
apply a feature extractor to the segments to determine a feature of each segment, wherein the classification score for the presence of the classification of material at the sampling location is additionally based upon the feature of each segment at the sampling location.

12. The non-transitory computer-readable medium of claim 10, wherein the program logic is further to direct the processor to:
segment the image into segments defined by presumed boundaries of individual bulk grain elements;
apply a plurality of feature extractors to each of the segments to determine a plurality of features for each segment, wherein the classification score for the presence of the classification of material at the sampling location is additionally based upon the plurality of features of each segment at the sampling location.

13. The non-transitory computer-readable medium of claim 10, wherein the program logic is further to direct the processor to:
apply a plurality of feature extractors to the image to determine a plurality of features of the bulk grain in the image; and
for each of the plurality of different sample locations in the image, determine, based upon the plurality of features of the bulk grain at the sampling location, a classification score for presence of a second classification of material at the sampling location, wherein the signal indicating quality of the bulk grain of the image is based upon an aggregate of the classification scores for the presence of a second classification of material at each of the sampling locations.

14. The non-transitory computer-readable medium of claim 10, wherein the program logic is further to direct the processor to apply a calibration function to the aggregate of the classification scores to determine a percent by weight of the classification of material for the image, wherein the signal is based upon the determined percent by weight of the classification of material for the image.

15. The non-transitory computer-readable medium of claim 10, wherein the program logic is further to direct the processor to output a signal indicating a confidence level in the signal indicating quality of the bulk grain of the image.

16. The non-transitory computer-readable medium of claim 10, wherein the program logic is further to direct the processor to output a signal indicating an uncertainty in the signal indicating quality of the bulk grain of the image.

17. The non-transitory computer-readable medium of claim 1, wherein the harvester harvests grain from plants in a growing medium.

18. The method of claim 1, wherein the image of bulk comprises (A) multiple individual bulk grain elements that are partially overlapped by other bulk grain elements or that are partially overlapping other bulk grain elements and (B) non-grain elements selected from a group of non-grain elements consisting of: chaff, hulls, cobs, stems and pods.

19. The method of claim 1, wherein the automatic adjustment of the operational settings of the harvester based upon the signal is carried out as a harvester is traversing a field and as the bulk grain is being harvested by the harvester.

20. A method comprising: capturing an image of bulk grain; applying a feature extractor to the image to determine a feature of the bulk grain in the image; for each of a plurality of different sampling locations within the image, determining, based upon the feature of the bulk grain at the sampling location, a classification score for presence of a classification of material at the sampling location; outputting a signal indicating quality of the bulk grain of the image based upon an aggregate of the classification scores of the different sampling locations; and applying a calibration function to the aggregate of the classification scores to determine a percent by weight of material having the classification for the image, wherein the signal is based upon the determined percent by weight of the material having the classification for the image; for each of the plurality of different sampling locations in the image, determining, based upon the plurality of features of the bulk grain at the sampling location, a classification score for the presence of a second classification of material at the sampling location, wherein the signal indicating quality of the bulk grain of the image is based upon an aggregate of the classification scores for the presence of the second classification of material at each of the sampling locations, and adjusting operational settings of a harvester based upon the signal.

\* \* \* \* \*

UNITED STATES PATENT AND TRADEMARK OFFICE
CERTIFICATE OF CORRECTION

PATENT NO. : 9,779,330 B2
APPLICATION NO. : 14/583473
DATED : October 3, 2017
INVENTOR(S) : Carl Knox Wellington et al.

Page 1 of 1

It is certified that error appears in the above-identified patent and that said Letters Patent is hereby corrected as shown below:

On the Title Page

Item (72), please delete "Cristian Dima, Sankt Ingbert (GE); Hanke Boesch, Tiefenthal (GE);" and substitute therefor --- Cristian Dima, Sankt Ingbert (DE); Hanke Boesch, Tiefenthal (DE); ---.

Signed and Sealed this
Twenty-fifth Day of February, 2020

Andrei Iancu
*Director of the United States Patent and Trademark Office*